United States Patent
Yu et al.

(10) Patent No.: US 11,597,478 B2
(45) Date of Patent: Mar. 7, 2023

(54) SYSTEMS FOR HANDLING ONE OR MORE ELONGATED MEMBERS AND METHODS FOR USING SAME

(71) Applicant: SOFEC, INC., Houston, TX (US)

(72) Inventors: Hao Yu, Katy, TX (US); Stephen P. Lindblade, Waller, TX (US); Vernon Raymond Jenkins, Crosby, TX (US); Miles Hobdy, Richmond, TX (US)

(73) Assignee: SOFEC, INC., Houston, TX (US)

( * ) Notice: Subject to any disclaimer, the term of this patent is extended or adjusted under 35 U.S.C. 154(b) by 331 days.

(21) Appl. No.: 16/886,380

(22) Filed: May 28, 2020

(65) Prior Publication Data
US 2020/0377180 A1 Dec. 3, 2020

Related U.S. Application Data

(60) Provisional application No. 62/854,097, filed on May 29, 2019.

(51) Int. Cl.
*B63B 27/34* (2006.01)
*B63B 27/08* (2006.01)
(Continued)

(52) U.S. Cl.
CPC .............. *B63B 27/34* (2013.01); *B63B 27/08* (2013.01); *B63B 27/24* (2013.01); *F16L 3/1091* (2013.01);
(Continued)

(58) Field of Classification Search
CPC ......... B63B 27/34; B63B 27/08; B63B 27/24; B63B 27/22; F16L 3/1091; F16L 3/23; F16L 1/00; E21B 43/013
See application file for complete search history.

(56) References Cited

U.S. PATENT DOCUMENTS 3,032,082 A * 5/1962 Vilain .................. B67D 9/02
414/139.6
3,685,133 A * 8/1972 Simon .................. F16L 55/00
29/237
(Continued)

FOREIGN PATENT DOCUMENTS

WO WO-2010137990 A1 * 12/2010 ............. B63B 27/24

OTHER PUBLICATIONS

International Search Report and Written Opinion for International Application No. PCT/US2020/034958 dated Sep. 15, 2020.

*Primary Examiner* — Tan Le
(74) *Attorney, Agent, or Firm* — Edmonds & Cmaidalka, P.C.

(57) ABSTRACT

Elongated member handling systems and methods for using same. The system can include one or more elongated members. A connector can be formed on or mechanically linked to a first end of each of the one or more elongated members. An optional cover can be coupled to the connector. The system can also include a pulling assembly at least partially disposed about the one or more elongated members and adjacent the first end of each of the one or more elongated members. The pulling assembly can include a support skid. The pulling assembly or, if present, the optional cover can include a primary pulling anchor. The system can also include a jumper winch configured to be mechanically linked to the primary pulling anchor. The jumper winch, when mechanically linked to the primary pulling anchor, can be configured to pull the pulling assembly from a first structure to a second structure.

21 Claims, 11 Drawing Sheets

(51) Int. Cl.
*F16L 3/10* (2006.01)
*F16L 1/00* (2006.01)
*E21B 43/013* (2006.01)
*F16L 3/23* (2006.01)
*B63B 27/24* (2006.01)
*B63B 27/22* (2006.01)

(52) U.S. Cl.
CPC ............... *F16L 3/23* (2013.01); *B63B 27/22* (2013.01); *E21B 43/013* (2013.01); *F16L 1/00* (2013.01)

(56) References Cited

U.S. PATENT DOCUMENTS

| | | | |
|---|---|---|---|
| 3,921,684 A | 11/1975 | Allen | |
| 4,231,398 A * | 11/1980 | Gibbons | F16L 37/1205 285/24 |
| 8,122,841 B2 | 2/2012 | Feger | |
| 8,296,914 B2 * | 10/2012 | Dupont | B67D 9/00 414/138.2 |
| 9,611,705 B2 | 4/2017 | Buytaert et al. | |
| 9,731,795 B2 | 8/2017 | Deletre et al. | |
| 10,093,189 B2 | 10/2018 | Sommarstrom | |
| 2012/0067434 A1 * | 3/2012 | Foo | B67D 9/00 137/15.01 |

\* cited by examiner

Step 1210
Providing a first structure

Step 1220
Mechanically linking a first jumper winch to a first proximal end of a hose assembly, wherein the hose assembly includes one or more hoses and the first proximal end includes a hose pulling assembly

Optional step 1225
Mechanically linking a second jumper winch to an opposite end of the hose assembly

Step 1230
Pulling the hose assembly from the first structure onto a house deck disposed on a second structure

Step 1240
Aligning the one or more hoses with one or more corresponding pipes on the hose deck by pulling the first hose pulling assembly onto a guide rail

Step 1250
Mechanically linking the one or more hoses to the one or more corresponding pipes

FIG. 12

Step 1310
Providing a floating vessel, the floating vessel including: a support structure mounted on an upper deck thereof; one or more extension arms suspended from the support structure; a ballast tank connected to the one or more extension arms, the ballast tank configured to move back and forth underneath the support structure; a yoke extending from and connected to the ballast tank at a first end thereof and a second end connected to the tower structure, the yoke comprising a tower connector disposed on the second end thereof; a first winch system located on the support structure, the first winch system connected to the yoke proximate the second end of the yoke via a first line or cable; and a second winch system connected to the ballast tank via a second line or cable

Step 1320
Mechanically linking a first jumper winch to a first end of a hose assembly, wherein the hose assembly comprises one or more hoses and a first hose pulling assembly disposed about a first end of the one or more hoses

Optional step 1325
Mechanically linking a second jumper winch to an opposite end of the hose assembly

Step 1330
Pulling the hose assembly between the vessel and the tower structure onto a hose deck

Step 1340
Aligning the one or more hoses with one or more corresponding pipes on the hose deck by pulling the hose pulling assembly onto a guide rail

Step 1350
Mechanically linking the one or more hoses to the one or more corresponding pipes

Optional Step 1355
Wherein mechanically linking the one or more hoses to the one or more corresponding pipes includes: mechanically linking a cylinder with a cylinder connection sling between a cylinder post formed on the hose deck and the first hose pulling assembly, actuating the cylinder to pull the two or more hoses to the corresponding pipes; and mechanically linking two or more flange bolts between the one or more hoses and one or more pipes to form a fluid tight connection between the hoses and the pipes

FIG. 13

SYSTEMS FOR HANDLING ONE OR MORE ELONGATED MEMBERS AND METHODS FOR USING SAME

CROSS-REFERENCE TO RELATED APPLICATION

This application claims priority to U.S. Provisional Patent Application No. 62/854,097, filed on May 29, 2019, which is incorporated by reference herein.

BACKGROUND

Field

Embodiments described herein generally relate to systems and methods for handling one or more elongated members. More particularly, such embodiments relate to elongated member handling systems for moving power cables, data cables, conduits, and/or other elongated members between a first structure and a second structure, such as between a floating vessel at sea and a tower structure used for hydrocarbon production.

Description of the Related Art

In the drilling and production of offshore oil and gas, mooring systems have been used to connect FPSO, FSO, and other floating vessels to various tower structures in the open sea. Conventional mooring systems can be permanent or disconnectable and have used rotating systems to allow the vessel to weathervane about its mooring point to better accommodate changing sea conditions. Conventional rotating systems have used turret systems that are internal or external to the vessel as well as turntable type buoys. Such rotatable systems allow the vessel to weathervane in normal to severe conditions, including those harsh environments offshore where seasonal cyclonic weather systems or icebergs can be predominant.

Production fluids are transferred from the tower across swivels located on the turntable and through elongated members, e.g., hoses, from the turntable to the vessel. The hoses, which can be used for production fluids, water, gas, lubrication, and fluid recovery, are typically thrown or craned between the tower and the vessel. The hoses are manually aligned and connected to piping on the tower and vessel for transfer of fluids. The connect and disconnect sequence can be time consuming and dangerous for the personnel involved in connecting or disconnecting the hoses.

To align and install the elongated members between a first structure and a second structure, it can be desirable to have an elongated member handling system that can more readily transport the elongated members and align and/or support the elongated members during the connect and disconnect procedures.

SUMMARY

Systems for handling one or more elongated members and methods for using same are provided. In some embodiments, an elongated member handling system, can include one or more elongated members. Each elongated member can have a first end and a second end. Each elongated member can have a connector formed on or mechanically linked to the first end of each of the one or more elongated members. Each connector can optionally include a cover coupled thereto. The system can also include a pulling assembly at least partially disposed about the one or more elongated members and adjacent the first end of each of the one or more elongated members. The pulling assembly can be moveably or fixedly coupled to an outer surface of each of the one or more elongated members. The pulling assembly can include a support skid that can be configured to contact a surface upon which the pulling assembly is moved. The pulling assembly or, if present, the optional cover can include a primary pulling anchor. The system can also include a jumper winch that can be configured to be mechanically linked to the primary pulling anchor. When the jumper winch is mechanically linked to the primary pulling anchor, the jumper winch can be configured to pull the pulling assembly from a first structure to a second structure.

In other embodiments, the elongated member handling system can include one or more elongated members. Each elongated member can have a first end and a second end. Each elongated member can have a connector formed on or mechanically linked to the first end of each of the one or more elongated members. Each connector can optionally include a cover coupled thereto. The system can also include a pulling assembly at least partially disposed about the one or more elongated members and adjacent the first end of each of the one or more elongated members. The pulling assembly can be moveably or fixedly coupled to an outer surface of each of the one or more elongated members. The pulling assembly can include a connection link anchor and a support skid. The support skid can be configured to contact a surface upon which the pulling assembly is moved. The pulling assembly or, if present, the optional cover can include a primary pulling anchor. The system can also include a first jumper winch that can be configured to be mechanically linked to the primary pulling anchor. When the first jumper winch is mechanically linked to the primary pulling anchor, the first jumper winch can be configured to pull the pulling assembly from a first structure to a second structure. The system can also include a guide rail disposed on the second structure. The support skid can be configured to engage with the guide rail. The guide rail can be configured to facilitate alignment of each connector with a corresponding connection interface located on the second structure when the pulling assembly is pulled into a position on the guide rail. The system can also include a connection link that can have a first end coupled to the second structure. The connection link anchor can be configured to engage with and mechanically link to a second end of the connection link when the pulling assembly is pulled into the position on the guide rail. The system can also include a second jumper winch that can be configured to be mechanically linked to the second end of at least one of the one or more elongated members. When the second jumper winch is mechanically linked to the second end of the at least one of the one or more elongated members, the second jumper winch can be configured to apply a tension to the second end of the at least one of the one or more elongated members. The system can also include a support surface disposed on the first structure. The support surface can be configured to support the one or more elongated members when the pulling assembly is pulled from the first structure to the second structure. The support surface can include a moveable surface, a low friction surface, or a combination thereof.

In some embodiments, a method for moving one or more elongated members from a first structure to a second structure can include mechanically linking a jumper winch to a primary pulling anchor disposed on a pulling assembly or an optional cover. The pulling assembly can be at least partially disposed about the one or more elongated members and adjacent a first end of each of the one or more elongated members. The pulling assembly can be moveably or fixedly coupled to an outer surface of each of the one or more elongated members. The pulling assembly can include a support skid. The support skid can be configured to contact a surface upon which the pulling assembly can be moved. A connector can be formed on or mechanically linked to the first end of each of the one or more elongated members. The optional cover, if present, can be coupled to the connector. The method can also include pulling the pulling assembly from the first structure to the second structure with the jumper winch. The method can also include aligning each connector with a corresponding connection interface located on the second structure. The method can also include mechanically linking each connector to each corresponding connection interface located on the second structure.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

FIG. 12 is an illustrative flow process representing one method for connecting one or more elongated members between a first structure and a second structure, according to one or more embodiments provided herein.

FIG. 13 is illustrative flow process representing another method for connecting one or more elongated members between a first structure and a second structure at sea, according to one or more embodiments provided herein.

DETAILED DESCRIPTION

Figure 1:
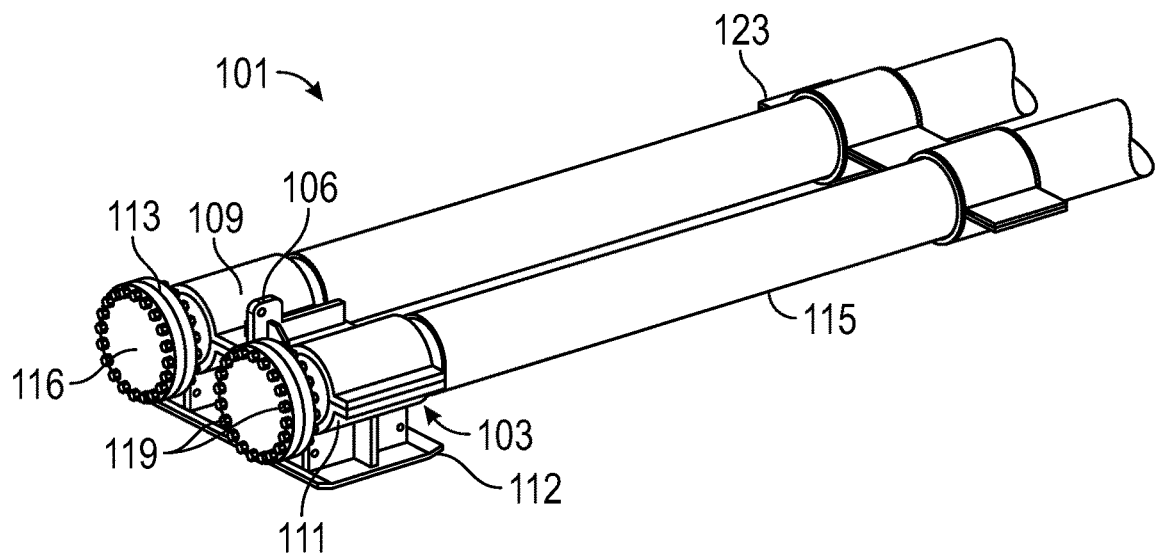
FIG. 1 depicts a schematic of an illustrative assembly that includes a pulling assembly at least partially disposed about one or more elongated members (two are shown), according to one or more embodiments provided herein.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to".

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

Each of the inventions will now be described in greater detail below, including specific or preferred embodiments, versions and examples, but the inventions are not limited to these embodiments, versions or examples, which are provided to enable a person having ordinary skill in the art to make and use the inventions, when the information in this disclosure is combined with publicly available information and technology.

FIG. 1 depicts an illustrative schematic of an assembly 101 that includes a pulling assembly 103 at least partially disposed about one or more elongated members (two are shown) 115, according to one or more embodiments. The assembly 101 can include one or more elongated members 115 (two are shown) each having a first end and a second end and a connector 113 disposed on at least the first end thereof. The assembly 101 can also include the pulling assembly 103 that can be formed, located, or otherwise at least partially disposed about the one or more elongated members 115 and adjacent the first end of each of the elongated members 115. The assembly 101 can also include a jumper winch that can be configured to be mechanically linked to the pulling assembly 103 via one or more cables or other lines as described in more detail below.

The one or more elongated members 115 can be or can include any one or more of a variety of different types of elongated members. In some embodiments, the elongated member 115 can be or can include, but is not limited to, tubular members, hoses, pipes, conduits, cables, communication lines, electrical lines, open channels, ducts, poles, cylinders, rods, fiber optic cables, mooring or anchoring lines, and the like. The elongated member 115 can transfer one or more fluids, power, signals, data, and the like. In some embodiments, the elongated member 115 can be or can include one or more hoses for transferring one or more fluids, one or more electric cables for transmitting power and/or signals, one or more data transmission cables, e.g., fiber optic cables, one or more mooring or anchoring lines, e.g., chain, cable, or rope, or any combination thereof. For simplicity and ease of description, the assembly 101 is shown and further described as including two hoses as the elongated members 115. It should be understood that the assembly 101 can be configured to include a single elongated member or any number of elongated members.

The hoses 115 can transfer fluids. The fluids can include produced fluids such as oil, gas, water, instrument or service air, nitrogen, lubrication fluid, hydraulic oil, hardening oil, machining oils and emulsions, honing oil, thermal oil (heat transfer oil), transformer oil, various types of solvents, maintenance oil, or any other fluid or mixture thereof. In some embodiments, if the hoses 115 transfer water, the water can be used as injection water, fire water, potable water, or any other suitable use. The hoses 115 can be made from any suitable material. In some embodiments, the hoses can be made from a synthetic fiber such as polyester or nylon filament, rubber, synthetic rubbers, a helix of steel alloy wire, a helix polyvinyl chloride plastic, or other suitable materials. The hoses 115 can be utilized for riser depressurization and fluid recovery, among other uses.

The connector 113 can be formed on or otherwise mechanically linked to the first end of each hose 115. In some embodiments, the second end of each elongated member 115 can also include a connector 113 formed on or otherwise mechanically linked thereto. In some embodiments, the connector 113 can be a flange. In other embodiments, the connector 113 can be an electrical connector, a fiber optic connector, a fluid connector, or other connector for transmitting one or more fluids, power and/or signals, or data, a hook, an anchor shackle, or other connector, depending, at least in part, on the type of elongated member 115. In some embodiments, an optional cover 116 can be mechanically linked to the connector 113 by one or more mechanical fasteners 119 or other fastener(s). In other embodiments, rather than a cover 116, a valve can be mechanically linked to the connector 113 by the one or more mechanical fasteners 119, welding, brazing and the like. In other embodiments, a valve can be disposed between the connector 113 and the cover 116, which can be secured together via the mechanical fasteners 119. The mechanical fasteners 119 can be or include, but are not limited to, threaded bolts, bolt and nut combinations, rivets, pins, screws, clamps, variable diameter shafts, or combinations thereof. The optional cover 116 and/or valve can prevent fluid transfer from or to an interior portion of the hoses 115.

The pulling assembly 103 can be at least partially disposed about the one or more hoses 115 adjacent a first end of the one or more hoses 115 and can be configured to support the first ends of the hoses 115 when pulling the one or more hoses 115 between a first structure and a second structure. In addition to the pulling assembly 103 being an anchor point configured to be pulled, the pulling assembly 103 can also be used to lift, lower, and/or support the hoses 115. An additional pulling assembly, not depicted in FIG. 1, can be disposed at least partially about the one or more hoses 115 adjacent the second end of the hoses 115.

In some embodiments, the pulling assembly 103 can be assembled or manufactured around the one or more hoses 115 having the connector 113 mechanically connected thereto by enclosing at least a portion of the hoses 115 within the pulling assembly 103. In other embodiments, each connector 113 can be formed, mechanically linked, welded, brazed, or otherwise attached to each hose 115 after each hose 115 is pulled through the pulling assembly 103 such that the two or more hoses 115 can be at least partially surrounded within the upper portion 109 and lower portion 111 of the pulling assembly 103 and the connectors 113 can abut a side of the pulling assembly 103. As such, the pulling assembly 103 can be a monolithic structure or can be composed of two or more components that can be assembled to form the pulling assembly 103. In some embodiments, the pulling assembly 103 can form a moveable sleeve about a portion of an outer surface of each of the hoses 115. In other embodiments, the pulling assembly 103 can be fixed in a position along the one or more hoses 115 by a clamping pressure or friction between the pulling assembly 103 and the one or more hoses 115.

The pulling assembly 103 can include a first or primary pulling anchor 106 and a pulling beam or support skid 112. The primary pulling anchor 106 can assist with pulling or supporting the elongated members 115 when moved between a first structure and a second structure during connection and/or disconnection operations. When pulled by the primary pulling anchor 106, the pulling assembly 103 can abut the connectors 113 on the hoses 115 and provide a directional force that can tend to move the one or more elongated members 115 along the direction of force.

In some embodiments, the primary pulling anchor 106 can be an aperture, opening, or bore, which can be for attachment. In other embodiments, the primary pulling anchor 106 can be or include a protrusion, such as a male type connector or any connector, not shown, for attachment, e.g., to a cable or other line. In some embodiments, the primary pulling anchor 106 can be located above a center of gravity of the hoses 115, which can help stabilize the end of the hoses 115 when the pulling assembly 103 is pulled from a first structure to a second structure.

In some embodiments, when the assembly 101 includes two or more elongated members 115, the assembly 101 can also include one or more spacers 123, one is shown, disposed at least partially about and at least partially between the two or more hoses 115. The one or more spacers 123 can be located adjacent to the connector 113, between the connector 113 and the pulling assembly 103, or can be located at some distance from the connector 113 between the pulling assembly 103 and the second end of the hoses 115. In some embodiments, a distance between the connector 113 disposed on the first end of each hose 115 and the spacer 123 can be from about 0.3 m, about 0.6 m, about 1 m, or about 1.5 m to about 3 m, about 5 m, about 6 m, about 10 m or more. The spacer 123 can be fixed in a position along the two or more hoses 115 by a clamping pressure or friction between the spacer 123 and the hoses 115. The spacer 123 can separate a portion of the hoses 115 by a distance, prevent the hoses 115 from contacting each other within a specified distance from the connectors 113, and/or help control movement of the two or more hoses 115 when the hoses 115 are moved between a first structure and a second structure during connection and/or disconnection operations. In some embodiments, the spacer 123 can separate a portion of the hoses 115 by a fixed distance, prevent the hoses 115 from contacting each other within a specified distance from the connectors 113, and/or help control the two or more hoses 115 during connection and/or disconnection operations. In some embodiments, the assembly 101 can include 1, 2, 3, 4, 5, 6, 7, 8, 9, 10, or more spacers 123 disposed between the first and second ends of the hoses 115.

Although not shown, in some embodiments the spacer 123 can include one or more spacer pulling anchors similar to or the same as the primary pulling anchor 106. The spacer pulling anchors can each be an aperture, opening, bore, protrusion, or other type of connector for attachment thereto. The spacer pulling anchor can be for mechanically linking a cable or other line thereto. Accordingly, the spacer 123 can also be used to pull, lift, lower, and/or otherwise support the one or more hoses 115.

Figure 2:
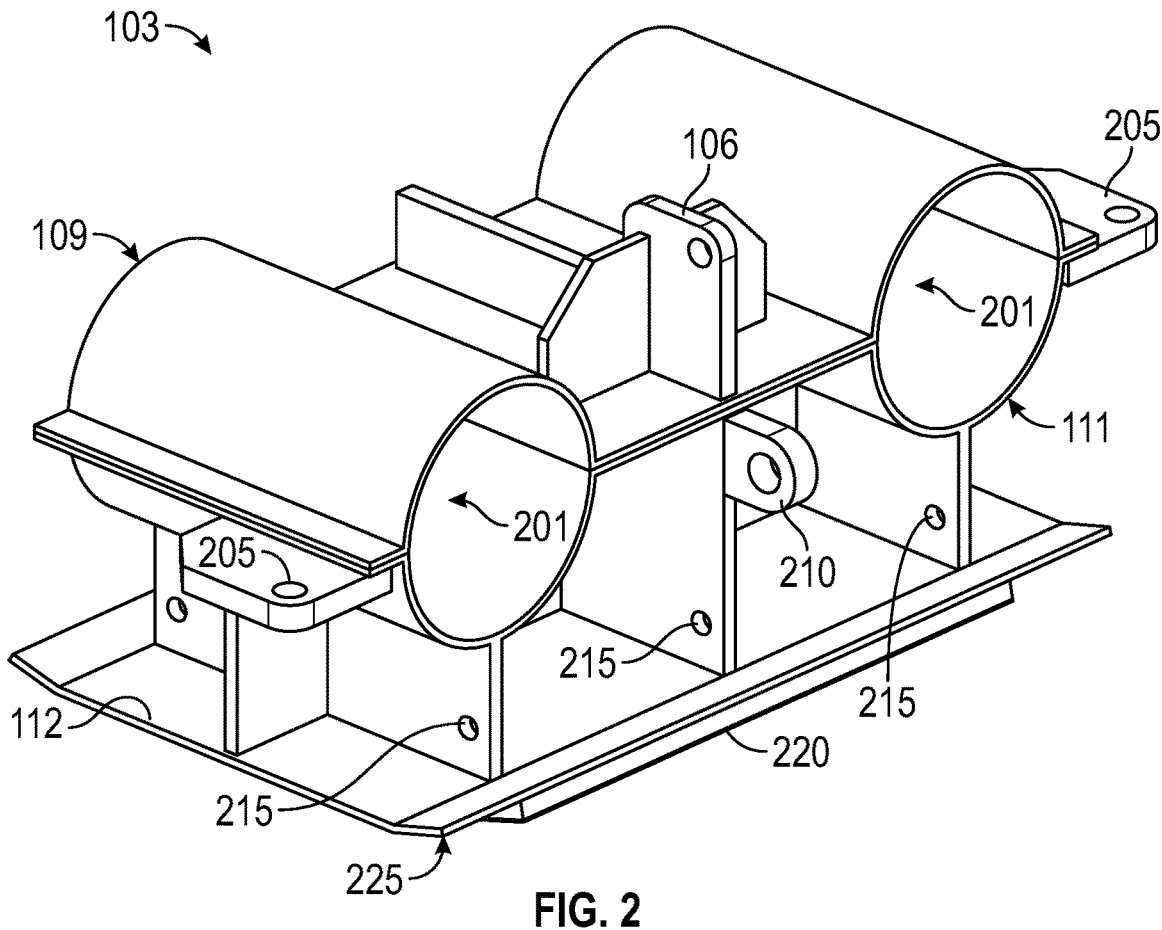
FIG. 2 depicts an enlarged perspective view of another illustrative pulling assembly, according to one or more embodiments provided herein.

FIG. 2 depicts an enlarged perspective view of another pulling assembly 103, according to one or more embodiments. The upper portion 109 and the lower portion 111 can together form one or more apertures, openings, or bores 201 therethrough, two are shown, through which a portion of one or more hoses 115, with reference to FIG. 1, can be disposed. Each aperture, opening, or bore 201 can surround a portion of each hose 115. Each aperture, opening, or bore 201 can have the same inner diameter or different inner diameters. The pulling assembly 103 can also include one or more second or auxiliary pulling anchors 215, three are shown; one or more temporary support anchors 205, two are shown; and/or one or more connection link anchors, e.g., cylinder anchors, 210, one is shown. The one or more auxiliary pulling anchors 215, the one or more temporary support anchors 205, and the one or more connection link anchors 210 can independently be an aperture, opening, or bore and/or can be or include a protrusion, such as a male type connector or any connector, not shown, for attachment. As described further below, the primary pulling anchor 106, the one or more auxiliary pulling anchors 215, the one or more temporary support anchors 205, and/or the one or more connection link anchors 210 can be utilized, separately or in combinations, along with the support skid 112, to mechanically support the pulling assembly 103, and any hoses 115 therein, when moved between a first structure to a second structure during connection and/or disconnection operations.

The support skid 112 can have a lower surface 225. The lower surface 225 can move or slide over a surface, not shown, while the pulling assembly 103 is being pulled over the surface. In some embodiments, the pulling assembly can also include a pad 220 to assist with transport of the pulling assembly 103 over the surface. The pad 220 can be fixed to the support skid 112 in any way including adhesives, mechanical fasteners, welding, brazing, and combinations thereof. The pad 220 can be made from any suitable material including metals, polymers, ceramics, composites, and combinations thereof. The pad 220 can include coatings applied to an outer surface of the pad 220 to help reduce friction between the pad 220 and the surface as the pad moves along the surface. The pad 220 can help protect coatings applied to any surfaces the pad 220 contacts. In some embodiments, the pad 220 can provide a low friction surface. In some embodiments, the pad 220 can be made from polytetrafluoroethylene, an ultra-high molecular weight polyethylene, a matrix of a fabric reinforced polymer, a high density polyethylene, polyoxymethylene, or a combination thereof.

The pulling assembly 103 can be produced from a single piece of material or by assembling two or more parts. The pulling assembly 103 or parts thereof can be 3-D printed, machined, forged, layered, cast, molded, welded, or combinations thereof. The pulling assembly 103 can be made from any suitable material including metals, polymers, ceramics, composites, and/or combinations thereof.

Figure 3:
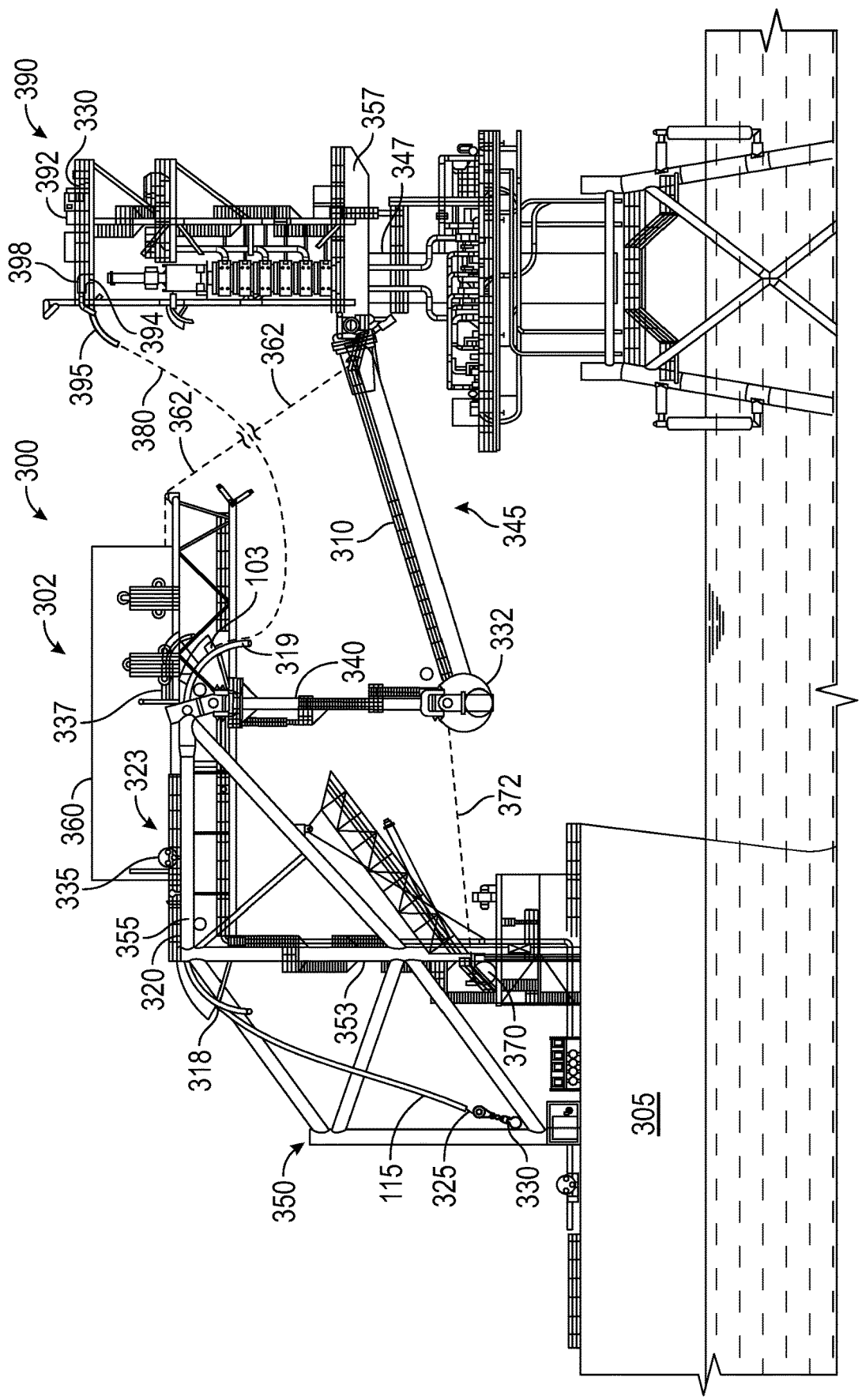
FIG. 3 depicts a schematic showing an illustrative elongated member handling system for connecting or disconnecting and moving one or more elongated members between a first structure and a second structure, according to one or more embodiments provided herein.

FIG. 3 depicts a schematic showing an illustrative elongated member handling system 300 for connecting or disconnecting one or more elongated member systems 302 between a first structure 305 and a second structure 390, according to one or more embodiments. The elongated member system 302 can include one or more of the assemblies 101 described above with reference to FIGS. 1 and 2. The first structure 305 and the second structure 390 can be any two structures between which one or more hoses 115 can be connected to and/or disconnected from and moved therebetween. In some embodiments, the first structure 305 and/or the second structure 390 can include, but are not limited to, floating vessels; tower structures; buildings, e.g., skyscrapers; cranes, e.g., construction cranes; sides of a ravine or other natural structures, or any combination thereof. For simplicity and ease of description, the first structure 305 is shown and further described as being a vessel and the second structure 390 is shown and further described as being a tower structure.

By "vessel" it can be meant any type of floating structure including but not limited to tankers, boats, ships, FSO's, FPSO's and the like. The tower structure 390 can include any offshore platform, rig, or any offshore structure the vessel 305 may connect to. The tower structure 390 can be fixed to the seabed, but can also be floating, anchored, or moored. In some embodiments, the tower structure 390 can include a base or jacket structure that can be fixedly attached to the seabed and a plurality of decks disposed on a support column 347 at various elevations above the water line. It should be understood that the decks can be arranged and designed to support various processing equipment, manifolds, etc.

In some embodiments, the tower structure 390 can further include a turntable 357 disposed on the support column 347. The turntable 357 can include a roller bearing, not shown, to allow the vessel 305 connected via a yoke 310 to freely weathervane about the tower structure 390. One or more decks, including an umbilical or hose deck 398, can be located above the turntable 357 and can be able to rotate with the turntable 357.

The vessel 305 can be moored (shown) or not moored (not shown) to the tower structure 390. The system 300 can be located or otherwise disposed on the vessel 305 and the tower structure 390. In some embodiments, the vessel 305 can include a support structure 350 disposed thereon and a portion of the system 300 can be located or otherwise disposed on the support structure 350. The system 300 can include one or more jumper winches or first jumper winches 392, one or more lines or first pull lines or cables 380, the pulling assembly 103, and the one or more hoses 115 that can each include the connector 113 mechanically linked to the first end thereof (see FIG. 1). In some embodiments, the system 300 can also include one or more jumper winches or second jumper winches 335 and one or more lines or second pull lines or cables 325.

The first jumper winch 392 can be disposed or otherwise located on the tower structure 390, e.g., on the hose deck 398. The second jumper winch 335 can be disposed or otherwise located on the vessel 305, e.g., on the support structure 350 or the umbilical deck or "hose deck" 320. The first jumper winch 392 can be mechanically linked via the first pull line or cable 380 to the primary pulling anchor 106 of the pulling assembly 103. The first jumper winch 392 can be configured to pull, lift, lower, and/or otherwise support the one or more hoses 115 via the first pull line or cable 380 and the pulling assembly 103 and, optionally, the spacer 123 during transfer between the vessel 305 and the tower structure 390. The second jumper winch 335 can be mechanically linked via the second pull line or cable 325 to a second end of the one or more hoses 115 and can be configured to apply a tension to the second end of the hoses 115 when the first jumper winch 392 pulls, lifts, lowers, and/or otherwise supports the pulling assembly 103 during transfer from the vessel 305 to the tower structure 390. The first and second pull lines 380, 325 can be a rope, a cable, a wire, a chain, or the like, or any combinations of thereof. The first jumper winch 392 can pull or otherwise cause the first ends of the hoses 115 to be positioned for connection to a tower hose interface 394. With the first ends the hoses 115 in position to connect to the tower hose interface 394, the second ends of the hoses 115 can also be in position to connect to a vessel hose interface 337.

During disconnection and return of the hoses 115 from the tower 390 to the vessel 305 the second jumper winch 335 can be configured to pull, lift, lower, and/or otherwise support the second end of the hoses 115 and the first jumper winch 392 can be configured to apply a tension to the pulling assembly 103 when the second jumper winch 335 pulls, lifts, lowers, and/or otherwise supports the second ends of the hoses 115 during transfer from the tower structure 390 to the vessel 305.

In some embodiments, each jumper winch 335, 392 can be electrically, pneumatically, and/or hydraulically actuated. In some embodiments, each jumper winch 335, 392 can be actuated via an electric switch, a hand pump, a hand crank, a wireless signal, a computer, or a combination thereof. In some embodiments, if the system 300 includes the first and second jumper winches 335, 392, the first and second jumper winches 335, 392 can be used independently and/or together.

The elongated member system 302 can include one or more assemblies 101 (see FIG. 1) for transmitting fluids, power, signals, and/or data, mooring lines and the like between the floating vessel 305 and the tower structure 390. In some embodiment, the elongated member system 302 can include 1, 2, 3, 4, 5, 6, 7, 8, 9, 10, or more assemblies 101. In some embodiments, each assembly 101 in the elongated member system 302 can be configured to couple about 1, 2, 3, 4, 5, 6, or more elongated members. In some embodiments, each assembly 101

In some embodiments, the hose deck 398 can be formed, located, or otherwise disposed on an upper deck or on the top of the tower structure 390. A tower bending shoe 395 can protrude from the hose deck 398. The tower bending shoe 395 can support the one or more hoses 115 during connection, disconnection, and/or storage of the one or more hoses 115. In some embodiments, the hose deck 320 can be formed, located, or otherwise disposed on the floating vessel 305 or the support structure 350. A first vessel bending shoe 318 can protrude from a first end of the hose deck 320. A second vessel bending shoe 319 can protrude from a second end of the hose deck 320. The first vessel bending shoe 318 and the second vessel bending shoe 319 can support the one or more hoses 115 during connection, disconnection, or storage.

In some embodiments, one or more hose support surfaces 323 can be disposed between the first vessel bending shoe 318 and the second vessel bending shoe 319. In some embodiments, the hose support surface 323 can be elevated above the first vessel bending shoe 318 and/or the second vessel bending shoe 319. In some embodiments, the hose support surface 323 can have a curved, e.g., arcuate, surface, a flat surface, or a combination thereof. In some embodiments, one or more of the first vessel bending shoe 318, the second vessel bending shoe 319, and the one or more hose support surfaces 323 disposed between the first vessel bending shoe 318, the second vessel bending shoe 319, and the tower bending shoe 395 can have a moving surface that can help convey or otherwise move the one or more hoses 115 thereon. In some embodiments, the moving surface can be or can include, but is not limited to, a conveyor belt, a plurality of roller bars (see 1105 in FIG. 11), or a combination thereof. In other embodiments, one or more of the first vessel bending shoe 318, the second vessel bending shoe 319, and the one or more hose support surfaces 323 disposed between the first vessel bending shoe 318, the second vessel bending shoe 319, and the tower bending show 395 can have a low friction surface. In some embodiments, the low friction surface can be or can include polytetrafluoroethylene, an ultra-high molecular weight polyethylene, a matrix of a fabric reinforced polymer, a high density polyethylene, polyoxymethylene, or a combination thereof.

During normal operations with the vessel 305 moored (or not moored) to the tower structure 390 and the hoses 115 connected therebetween, the one or more hoses 115 can transfer fluid, power, data, etc. between the tower structure 390 and the vessel 305 has terminated and the vessel 305 needs to depart, the hoses 115 can be disconnected from the tower hose interface 394, retrieved to the vessel 305, and stored for transportation. Alternatively, the one or more hoses 115 can be disconnected from the vessel hose interface 337 and stored on the tower structure 390.

One or more pulley blocks or snatch blocks 330 can be disposed or otherwise located on the floating vessel 305, the hose deck 320, the support structure 350, the tower structure 390, and/or on the hose deck 398 for routing the first and second pull lines 380, 325 from the first and second jumper winches 392, 335 to the one or more hoses 115 and/or the pulling assembly 103. The one or more snatch blocks 330 can be fixed or movable. For example, the one or more snatch blocks 330 can be moved along a rail or between anchor points that can be formed, located, or otherwise disposed on the support structure 350 and/or on a hose deck 398. If the hoses 115 have different weights, during connection and/or disconnection operations, the assembly 101 may rotate about a centerline of the primary pulling anchor 106. During operations, the rotated assembly 101 can rotate back upon contact with the second vessel bending shoe 319 or the tower bending shoe 395. In some embodiments, if the hoses 115 have different weights, the assembly 101 can include one or more counterweights to compensate for weight differences between different hoses 115.

The term "snatch block" refers to any pulley type that can allow the pull lines 325, 380, or any other line, to be fit over an internal pulley within the snatch block 330 without threading an end of the pull lines 325, 380, or any other line, through the snatch block 330. The term "pulley block" and "snatch block" are used interchangeably herein and any such devices can be used interchangeably in some or all practical applications, according to one or more embodiments provided herein. It should be understood that any other pulley mechanism, e.g., one that does not allow the pull lines 325, 280 or other line to be fit over an internal pulley within the snatch block 330 without threading an end of the pull lines 325, 380, or any other line, through the pulley mechanism can also be used.

A yoke mooring system ("YMS") 345 can be located or otherwise disposed on top of the vessel 305. It should be appreciated by those skilled in the art that the YMS 345 can be mounted on converted vessels as well as new-built vessels. The YMS 345 can include a yoke 310, a ballast tank 332, and one or more link or extension arms 340 connected to the support structure 350. The YMS 345 can further include a first or yoke lift winch system 360 and a second or yoke pull-back winch system 370. Each winch system 360, 370 can be electric, pneumatic, hydraulic or a combination thereof. Each winch system 360, 370 can also have motion compensation, including active heave compensation (AHC) and/or passive heave compensation (PHC). In certain embodiments, each of the winch systems 360, 370 can use any combination of AHC, PHC and tension control to rapidly and accurately lift and/or pull-back the yoke 310 as needed in harsh offshore environments.

In some embodiments, the support structure 350 can be a raised tower or other framed structure for supporting the hose deck 320, the yoke 310, the ballast tank 332 and the extension arms 340. The support structure 350 can include a generally vertical portion 353 and a generally horizontal portion 355. The generally horizontal portion 355 can be cantilevered. The generally horizontal portion 355 can extend beyond the bow of the vessel 305 and help support the weight of the hose deck 320, the one or more hoses 115, the yoke 310, and the tank 332.

Each winch system 360, 370 can be capable of quick movements and fast reaction times at the requisite tensions and loads to safely manipulate and control the movement of the yoke 310 while connecting and/or disconnecting to the tower structure 390, at sea, using only the facilities located on the vessel 305 itself. The winch systems 360, 370 can be used independently, or together. Each winch system 360, 370 can be or can include a dedicated hydraulic power unit and any combination of one or more winches, controls, compensating cylinders, sheaves, accumulators and/or oil coolers. The one or more winches and one or more compensating cylinders can be used in parallel or in series. The one or more compensating cylinders can be vertical or horizontal. In certain embodiments, the one or more winches and one or more compensating cylinders can be used in tandem (i.e. series) such that the compensating cylinders work at high speeds and low tension to gather the lines rapidly to control the swing movement of the yoke 310, ballast tank 332, or both, and the winches can be designed to handle higher tension requirements, such as during the initial lift and/or pull back upon disconnection, for example. The size, weight, and overall geometry of the winch systems 360, 370 can dictate the most advantageous location on the YMS 345 or vessel 305.

In operation, the first or yoke lift winch system 360, for example, can be used to hold and control movement of the yoke 310, including vertical movement of the yoke 310, via a yoke lift line 362 while connecting and/or disconnecting to a tower structure. For example, the yoke lift winch system 360 can be used to raise, lower, and hold the yoke 310 in position as the vessel 305 is pulled to the tower structure 390 for connection; and to support, handle and rapidly lift the yoke 310 during disconnection from the tower structure 390. The pull-back winch system 370 can be used to hold and control movement of the ballast tank 332, including the horizontal movement of the ballast tank 332, via a pull-back line 372 during disconnection and during storage for transit. The pull-back winch system 370 can be used to affect the yaw angle of the ballast tank 332 and the yoke 310. During disconnection, for example, the yoke lift winch system 360 and the pull-back winch system 370 can be used together to lift, lower, pullback and/or hold the yoke 310, preventing the yoke 310 from colliding with the tower structure 390 and causing physical damage to itself or the tower or both. The pull-back winch system 370 could be used to manipulate and control movement of the ballast tank during connection. In certain embodiments, the pull-back winch system 370 is not used during connection. The yoke 310 can be any elongated structure with sufficient strength to connect the vessel 305 to an offshore structure. The yoke lift line 362 and the pull-back line 372 can be rope, cable, wire, chain, or the like, or any combinations of the same.

The ballast tank 332 can be any container, drum or the like capable of holding water or other ballast. The ballast tank 332 can be connected to the yoke 310 and/or the extension arm(s) 340. The ballast tank 332 serves as a counter balance or restoring force as the vessel 305 moves at sea. The ballast tank 332 can be connected to the support structure 350 through the one or more extension arms 340.

The tower structure 390 can be typically fixed to the seabed but can also be floating, anchored, moored or not moored. The tower structure 390 can include a base or jacket structure that can be fixedly attached to the seabed and a plurality of decks disposed on a support column 347 at various elevations above the water line. It can be understood by those of skill in the art that the decks are arranged and designed to support various processing equipment, manifolds, etc.

As noted above, the tower structure 390 can include a turntable 357 disposed on the support column 347. The turntable 357 can include a roller bearing, not shown, to allow the vessel 305 connected via its yoke 310 to freely weathervane about the tower structure 390. One or more decks, including the hose deck 390, can be located above the turntable 357 and able to rotate with the turntable 357.

The extension arms 340 can be connected to the generally horizontal section 355 of the support structure 350 via one or more upper U-joints, not shown. The extension arms 340 can also be connected to the ballast tank 332 using one or more lower U-joints, not shown. The extension arms 340 can include one or more jointed sections that are mechanically connected together. The support structure 350 via connection through the extension arms 340 suspends the ballast tank 332. The U-joints are provided as one type of coupler that can be used, however, any type of coupling that permits angular movement between its connections can be equally employed.

Figure 4:
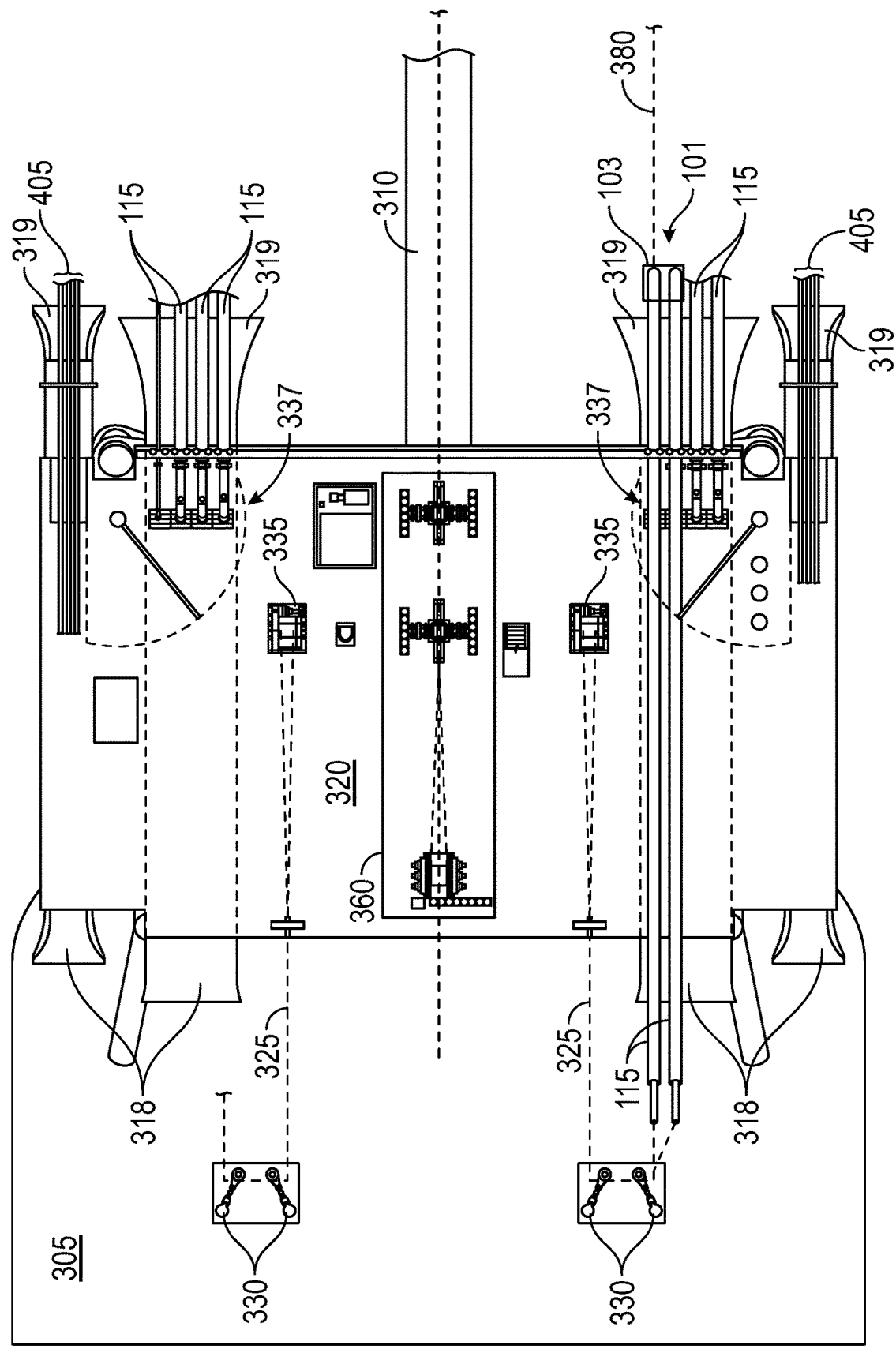
FIG. 4 depicts a schematic showing an illustrative hose deck formed, located, or otherwise disposed on the first structure shown in FIG. 3, according to one or more embodiments provided herein.

FIG. 4 depicts a schematic depicting an illustrative hose deck 320 formed, located, or otherwise disposed on top of the support structure 350 shown in FIG. 3, according to one or more embodiments. In some embodiments, the assembly 101 can be stowed on the support structure 350 or the tower structure 390 when not connected between the vessel 305 and the tower structure 390. One or more additional hoses 115, four are shown, can be installed within a vessel hose interface 337 for transfer of fluids to and from the vessel 305. One or more power and/or data cables 405 can be located or otherwise disposed on the vessel 305, for example, on the hose deck 320 as shown. The power and/or data cables 405 can be appropriately installed for transfer of power and data to and from the vessel 305. Two or more power and/or data cables 405, or one or more power and/or data cables 405 and one or more hoses 115, can be joined into a cable assembly, not shown.

Figure 5:
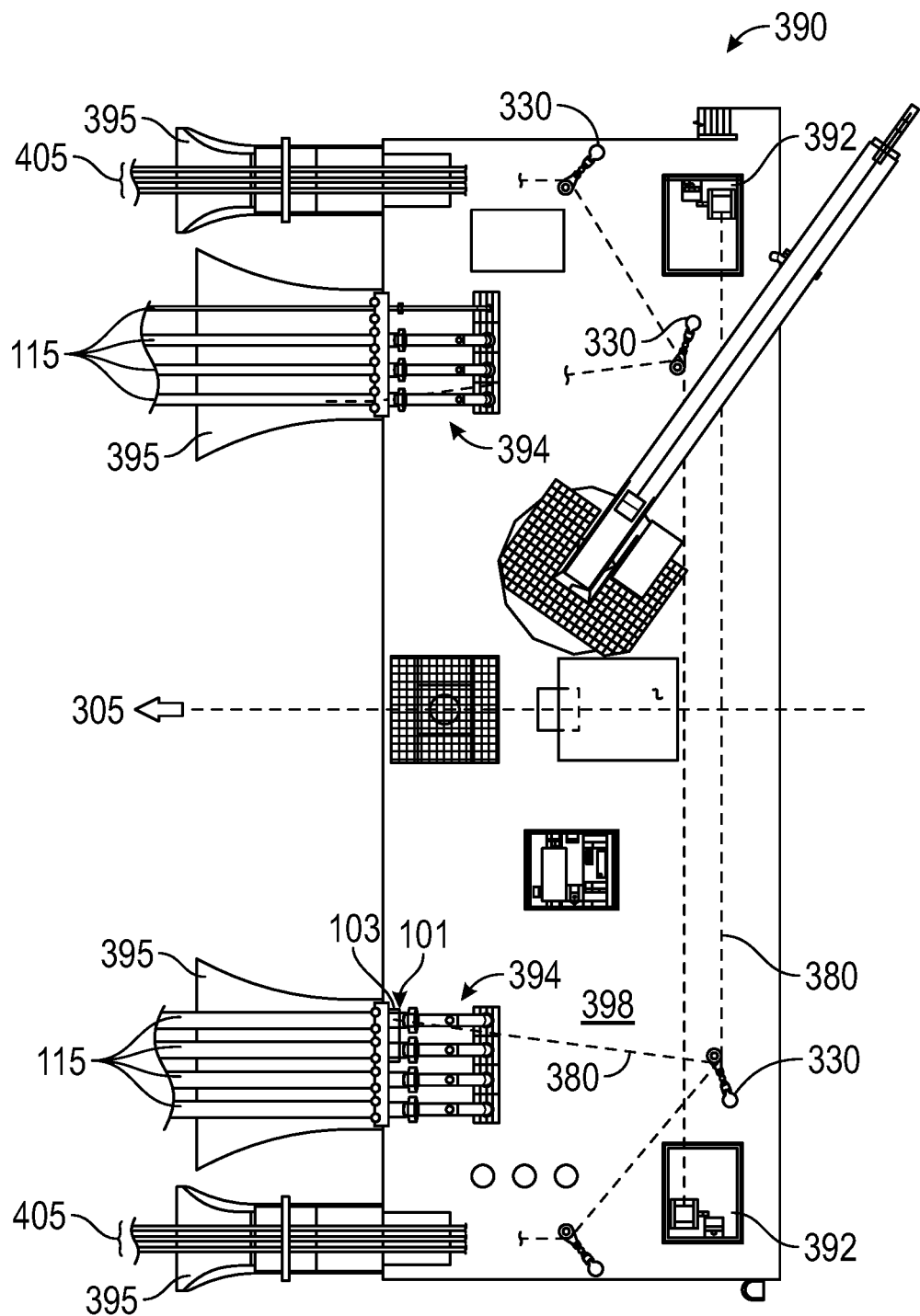
FIG. 5 depicts a schematic showing an illustrative hose deck formed, located, or otherwise disposed on the second structure shown in FIG. 3, according to one or more embodiments provided herein.

FIG. 5 depicts a schematic depicting an illustrative hose deck 398 formed, located, or otherwise disposed on the tower structure 390 shown in FIG. 3, according to one or more embodiments. As depicted, the assembly 101 that includes the pulling assembly 103 is positioned prior to installation of the hoses 115 into a tower hose interface 394. The pull line 380 can be mechanically linked to the pulling assembly 103 and the jumper winch 392 can support the assembly 101 prior to connection or disconnection. One or more additional hoses 115, four are shown, can be installed within the tower hose interface 394 for transfer of fluids to and from the tower structure 390. One or more power and/or data cables 405 can be located or otherwise disposed on the tower structure 390, for example, on the hose deck 398 as shown. The power and/or data cables 405 can be appropriately installed for transfer of power and data to and from the tower structure 390.

Referring to FIGS. 4 and 5, during connection operations, as explained in more detail below, the assembly 101 can be pulled between the vessel 305 and the tower structure 390 utilizing a first and second jumper winch 335, 392; two jumper winches 335 and two jumper winches 392 are shown. A free end of each pull line 325, 380 can be connected to one end of each hose 115 or the pulling assembly 103. One jumper winch 335 or 392 can be used to pull the assembly 101 while an opposing jumper winch 335 or 392 can be used to hold the opposite end to control the travel. Each jumper winch 335, 392 can be operated by a local manual control panel or by remote or automated controls.

Figure 6:
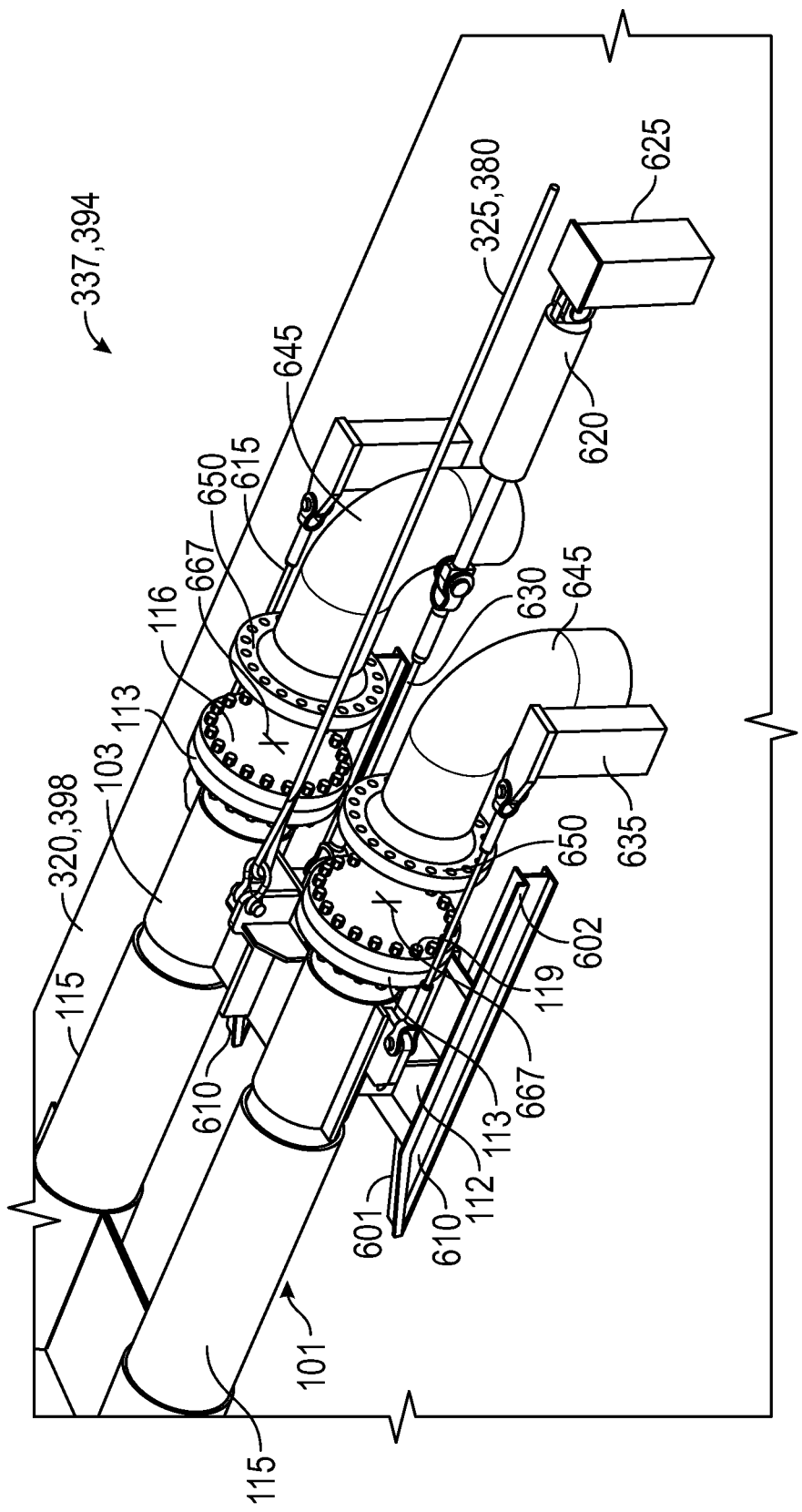
FIG. 6 depicts an enlarged perspective view of an illustrative assembly disposed on the hose deck shown in FIG. 5 prior to connection of the elongated members to corresponding connection interfaces, according to one or more embodiments provided herein.

FIG. 6 depicts an enlarged perspective view of the assembly 101 disposed on the hose deck 398 shown in FIG. 5 prior to connection of the hoses 115 to the tower hose interfaces 394, according to one or more embodiments. The tower hose interfaces 394 can include one or more pipes or other conduits 645, two are shown, with connection interfaces 650 formed, mechanically linked, welded, brazed, or otherwise attached to the end of the pipes 645. It should be understood that the hose interfaces 337 and 394 can also be referred to as a connection interface or connection interfaces when other elongated conduits, e.g., electric cables, data transmission cables, fiber optic cables, etc., are present. The connection interface can be a pipe, a plug, a socket, or any other structure configured to connect with and secure the elongated conduits 115 thereto. The tower hose interfaces 394 can also include one or more guide rails 610, one or more connection link posts, e.g., cylinder posts 625, one or more support posts 635, or any combination thereof.

The one or more guide rails 610 and the support skid 112 can be configured to help align the ends of the hoses 115 in the assembly 101 with the connection interfaces 650 disposed on the pipes 645. For example, the one or more guide rails 610 can each include a slide surface 601 formed, located, or otherwise disposed on the upper surface of each guide rail 610. Two guide rails 610 with slide surfaces 601 can be positioned along the hose deck 398 at an appropriate distance from each other such that the support skid 112 can be pulled and slid over the slide surfaces 601 and rest thereupon. Opposing guide beams 602 can be disposed along outer edges of the slide surfaces 601 such that the support skid 112 can be kept between the guide beams 602 while on the slide surfaces 601. An end of each guide rail 610 can include a sloped region within each slide surface 601 upon which the support skid 112 can slide to raise the assembly 101 such that the hoses 115 can be appropriately aligned with the pipes 645 along a local horizontal of center line 667. Once the support skid 112 is disposed upon the slide surfaces 601 and between the guide beams 602, the hoses 115 can be aligned with the pipes 645 along a local vertical and the local horizontal of center line 667. In some embodiments, not depicted, the support skid 112 can fit at least partially around and/or at least partially over the one or more guide rails 610 and/or the one or more guide beams 602 such that the hoses 115 can be aligned with the pipes 645 along at least the local vertical of center line 667. It should be understood that there are numerous configurations that can be used to facilitate engagement and cooperation between the pulling assembly 103 and the guide rail 610. The hoses 115 can be aligned with the pipes 645 by pulling the assembly 101 to cause the assembly 101 to engage with the guide rail 610 and cooperation therebetween can facilitate the alignment.

The two slide surfaces 601 can be separate and distinct surfaces or can be combined into a single slide surface between two guide rails 610. Two or more guide rails 610 can be combined into a single assembly, not shown. For example, three guide rails 610, can be combined to form a single slide surface 601 or three slide surfaces 601. A first guide rail 610 can be disposed between a second and third guide rail 610, where the first guide rail 610 can provide structural support to a pulling assembly 103 resting thereupon with the pulling assembly 103 also resting thereupon and between the second and third guide rails 610.

In some embodiments, one or more support slings 615, two are shown; one or more connection links, e.g., cylinders, 620, one is shown; one or more connection link slings, e.g., cylinder connection sling, 630, one is shown, or an combination thereof, can be utilized to support and facilitate the connection and disconnection of the hoses 115 to the pipes 645. During operations, the connectors 113 and the connection interfaces 650 can be joined to facilitate the transport of fluids between the hoses 115 and the pipes 645.

Figure 7:
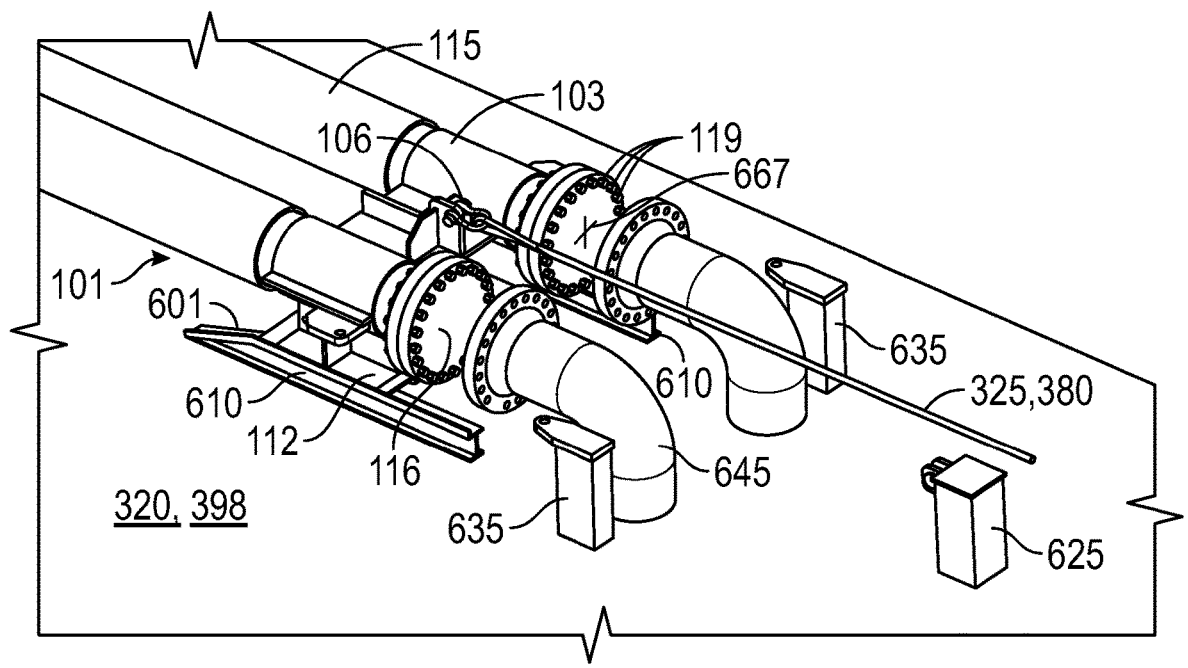
FIG. 7 depicts another enlarged perspective view of the assembly disposed on the hose deck shown in FIG. 5 prior to connection of the elongated members to corresponding connection interfaces, according to one or more embodiments provided herein.
Figure 8:
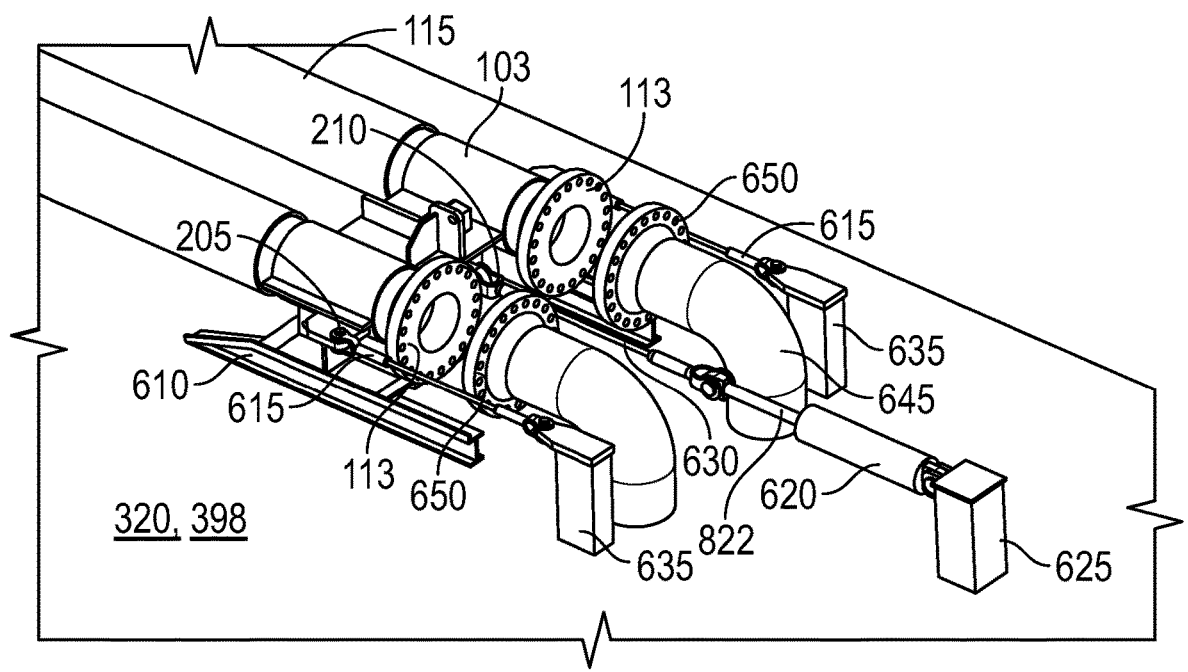
FIG. 8 depicts another enlarged perspective view of the assembly with the corresponding connection interfaces prior to connection, according to one or more embodiments provided herein.

FIG. 7 depicts another enlarged perspective view of the assembly 101 disposed on the hose deck 398 shown in FIG. 5 prior to connection of the elongated members 115 to the corresponding connection interfaces, according to one or more embodiments. In some embodiments, the pull line 325, 380 can pull the assembly 101 up and over the guide rails 610 to align the hoses 115 with the pipes 645. FIG. 8 depicts another enlarged perspective view of the assembly 101 with the corresponding connection interfaces prior to connection, according to one or more embodiments.

Referring to FIGS. 7 and 8, during connection operations, in some embodiments, one or more support slings 615, two are shown, can be attached between the support posts 635 and the support anchors 205 on the pulling assembly 103 to secure the assembly 101 in an aligned position with the pipes 645. The pull line 325, 380 can be removed. The caps 116 can be removed. In some embodiments, the connection link 620 and connection link sling 630 can be attached between the cylinder post 625 and the cylinder anchor 210 on the pulling assembly 103. The connection link 620 can be an electric, hydraulic, or pneumatic cylinder and can be hand actuated using a hand pump or actuated using an electric current or an electric or motorized pump. A shaft 822 can be disposed within the cylinder 620. During operation of the connection link 620, the shaft 822 can be motivated by the cylinder to travel in and out of the cylinder, pulling or pushing the cylinder connection sling 630 and the pulling assembly 103. The support slings 615 can be removed and the cylinder 620 can be actuated to pull the hoses 115 toward the pipes 645 until the connectors 113 and connection interfaces 650 contact each other. In other embodiments, the first jumper winch 392 can be used to pull the pulling assembly 103 all the way in and a rigid or semi-adjustable connection link 620 can be connected to the connection link anchor 210 to hold the pulling assembly 103 in a substantially fixed position while the connections can be made.

Figure 9:
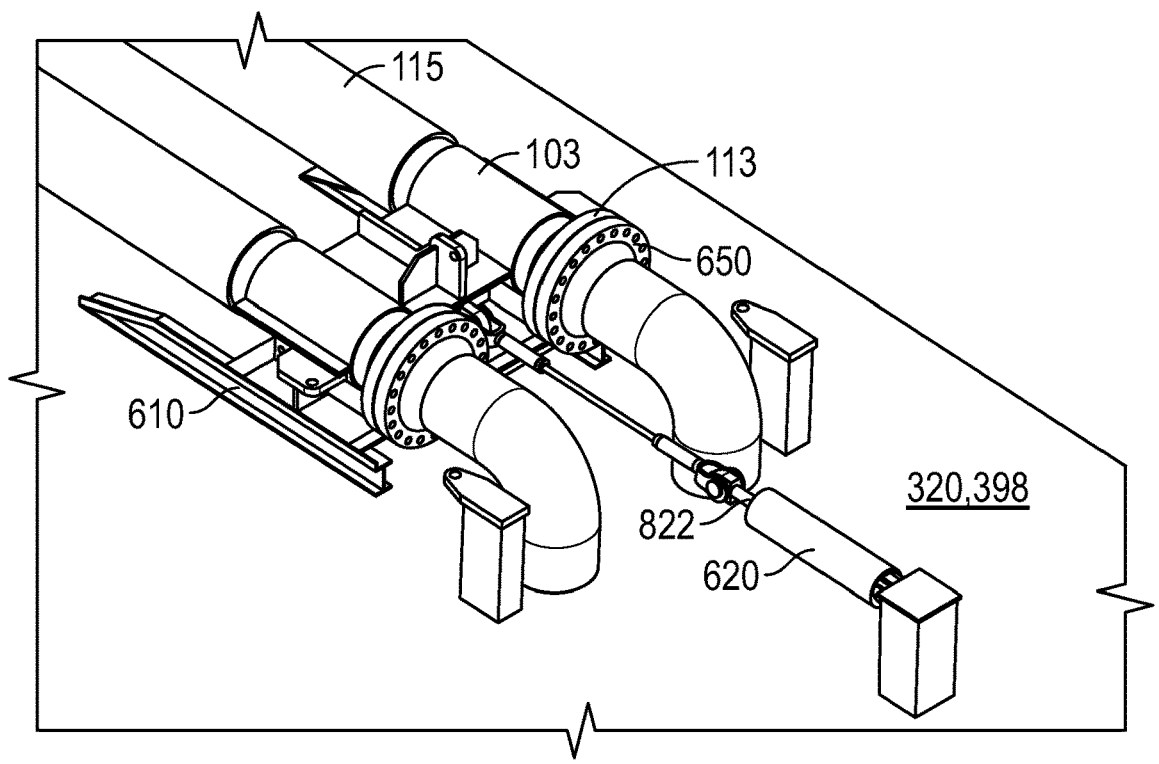
FIG. 9 depicts an enlarged perspective view of the assembly after connectors disposed on the first ends of the elongated members have been pulled together with the corresponding connection interfaces, according to one or more embodiments provided herein provided herein.
Figure 10:
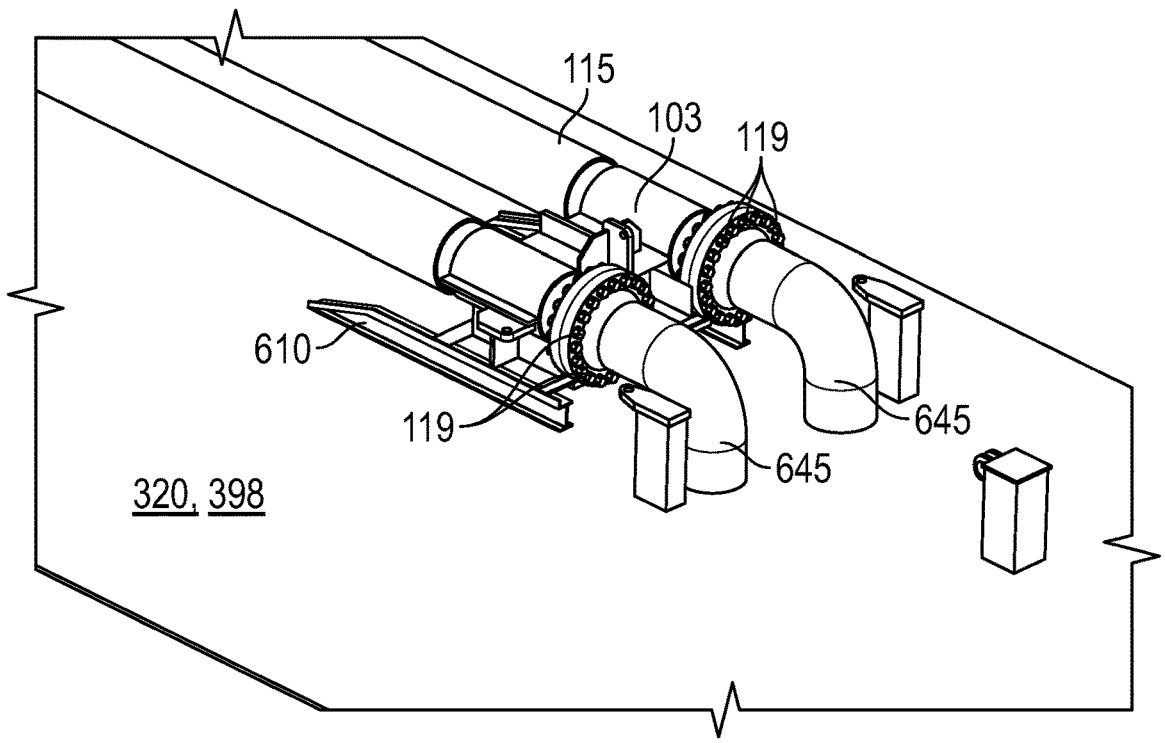
FIG. 10 depicts an enlarged perspective view of the elongated members mechanically linked to the corresponding connection interfaces, according to one or more embodiments provided herein.

FIG. 9 depicts an enlarged perspective view of the assembly 101 after the connectors 113 and the connection interfaces 650 have been pulled together, according to one or more embodiments. FIG. 10 depicts an enlarged perspective view of the hoses 115 mechanically linked to the pipes 645, according to one or more embodiments. Referring to FIGS. 9 and 10, during connection operations the mechanical fasteners 119 can be attached between the connectors 113 and the connection interfaces 650, mechanically linking the connectors 113 to the connection interfaces 650 to form a fluid tight connection between the hoses 115 and the pipes 645. The disconnection operations can be performed in a similar but reverse fashion.

As shown in FIGS. 6-10, the pulling assembly 103 and hoses 115 can be pulled straight into alignment and contact with the corresponding connection interfaces 650. In other embodiments, however, the pulling assembly 103 and hoses 115 can be pulled into a final position on the guide rail 610 after which the corresponding connection interfaces 650 can be positioned such that connection between the connectors 113 and the corresponding connection interfaces 650 can be made. In such embodiment, a curved pipe fitting or other appropriate fitting can be used to connect the connectors 113 to the corresponding connection interfaces 650.

Figure 11:
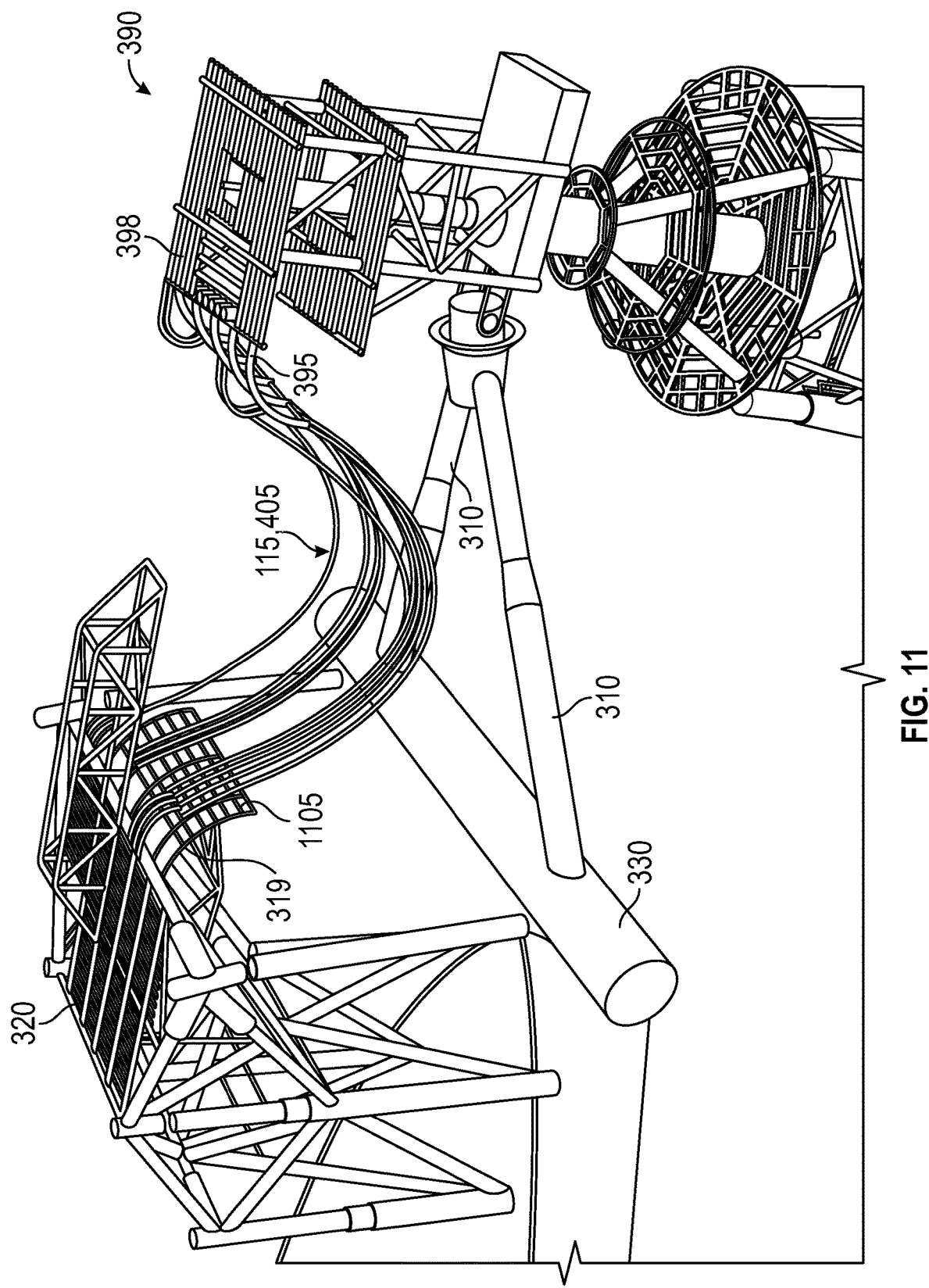
FIG. 11 depicts a schematic perspective view of a vessel moored to a tower structure with a plurality of elongated members, e.g., hoses, power cables, and/or data cables, connected therebetween, according to one or more embodiments provided herein.

FIG. 11 depicts a schematic perspective view of the vessel 305 moored to the tower structure 390 with a plurality of elongated members, e.g., hoses 115 and power and/or data cables 405, connected therebetween, according to one or more embodiments. The hoses 115 and power and/or data cables 405 can be flexible. The hoses 115 and power and/or data cables 405 can be U-shaped catenary to accommodate movement of the vessel 305 relative to the tower structure 390.

As noted above, in some embodiments, the second vessel bending shoe 319 can include a moveable surface 1105. As shown, the moveable surface 1105 can include a plurality of roller bars. In other embodiments, the moveable surface 1105 can include a conveyor belt. In still other embodiments, the second vessel bending shoe 319 can include a low friction surface as also described above. The first vessel bending shoe 318 and/or the one or more hose support surfaces disposed between the first vessel bending shoe and the second vessel bending shoe can also include a moveable surface and/or a low friction surface as described above.

FIG. 12 is an illustrative flow process representing one method for connecting one or more elongated members between a first structure and a second structure, according to one or more embodiments. In reference to FIG. 12, one method for connecting the elongated conduit assembly between the first structure and the second structure can include: (step 1210) providing a first structure; (step 1220) mechanically linking a first jumper winch to a first proximal end of a hose assembly, wherein the hose assembly includes one or more hoses and the first proximal end includes a pulling assembly; (optional step 1225) mechanically linking a second jumper winch to an opposite end of the hose assembly; (step 1230) pulling the hose assembly from the first structure onto a hose deck disposed on a second structure; (step 1240) aligning the one or more hoses with one or more corresponding pipes on the hose deck by pulling the first pulling assembly onto a guide rail; and (step 1250) mechanically linking the one or more hoses to the corresponding pipes.

FIG. 13 is an illustrative flow process representing another method for connecting the elongated conduit assembly between the vessel and the tower structure at sea, according to one or more embodiments provided herein. In reference to FIG. 13, one method for connecting the elongated conduit assembly between the vessel and the tower structure at sea can include: (step 1310) providing a floating vessel, the floating vessel including: a support structure mounted on an upper deck thereof; one or more extension arms suspended from the support structure; a ballast tank connected to the one or more extension arms, the ballast tank configured to move back and forth underneath the support structure; a yoke extending from and connected to the ballast tank at a first end thereof and a second end connected to the tower structure, the yoke including a tower connector disposed on the second end thereof; a first winch system located on the support structure, the first winch system connected to the yoke proximate the second end of the yoke via a first line or cable; and a second winch system connected to the ballast tank via a second line or cable; (step 3320) mechanically linking a first jumper winch to a first end of a hose assembly, wherein the hose assembly includes one or more hoses and a first pulling assembly disposed about and adjacent to the first end of the one or more hoses; (optional step 3325) mechanically linking a second jumper winch to an opposite end of the hose assembly; (step 1330) pulling the hose assembly between the vessel and the tower structure onto a hose deck; (step 1340) aligning the one or more hoses with one or more corresponding pipes on the hose deck by pulling the pulling assembly onto a guide rail; (step 3350) mechanically linking the one or more hoses to the one or more corresponding pipes; and (optional step 3355) wherein mechanically linking the one or more hoses to the corresponding pipes includes: mechanically linking a cylinder with a cylinder connection sling between a cylinder post formed, located, or otherwise disposed on the hose deck and the first pulling assembly, actuating the cylinder to pull the one or more hoses to the corresponding pipes; and mechanically linking two or more flange bolts between the one or more hoses and the one or more pipes to form a fluid tight connection between the hoses and the pipes.

Figure 14:
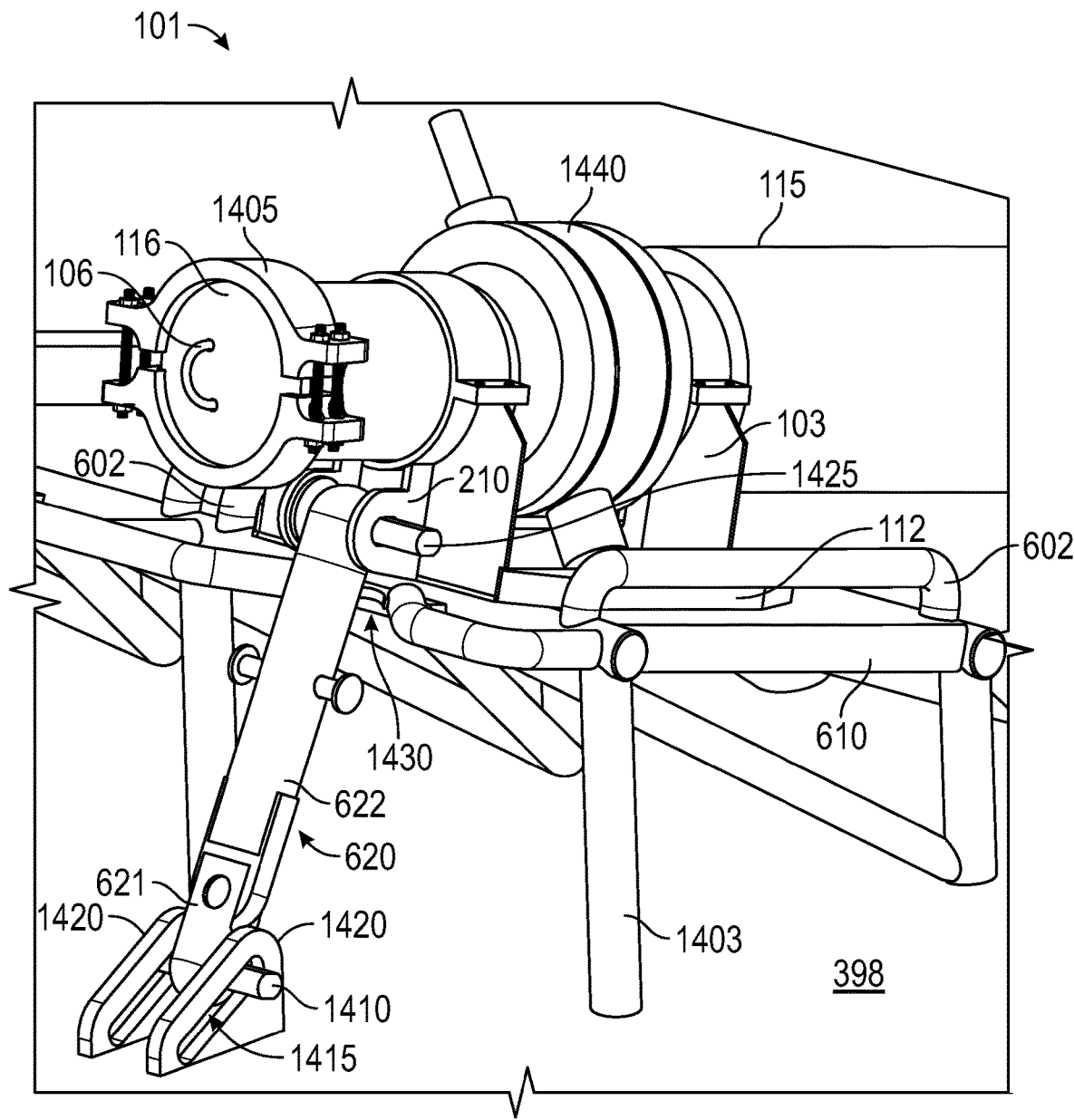
FIG. 14 depicts a schematic of another illustrative assembly disposed on a hose deck, according to one or more embodiments provided herein.

FIG. 14 depicts a schematic of another illustrative assembly 101 disposed on a hose deck 398, according to one or more embodiments. The assembly 101 can include one or more hoses (and/or other elongated members) 115 that can have a connector 113 (see FIG. 1) formed on or mechanically linked to the first end of the hose 115. The assembly 101 can also include a pulling assembly 103 that can be at least partially disposed about the hose 115 and adjacent the first end of the hose 115. The pulling assembly 103 can be fixedly or moveably coupled about an outer surface of the hose 115. The pulling assembly 103 can also include a support skid 112 that can be configured to contact a guide rail 610 disposed on the hose deck 398 upon which the pulling assembly 103 can be moved. As shown, the pulling assembly 103 is located on the guide rail 610 between opposing guide beams 602. While the guide rail 610 is shown as being elevated off the hose deck 398 via a support rack 1403, it should be understood that the guide rail 610 can also be disposed directly on the hose deck 398.

A cover 116 can be coupled to the connector 113. In some embodiments, the cover 116 can be coupled to the connector 113 via a clamp connector 1405. In other embodiments, the cover 116 can be coupled to the connector 113 via one or more fasteners, e.g., bolts and nuts (not shown). In some embodiments, the cover 116 can include the primary pulling anchor 106 rather than the pulling assembly 103 as described above. In other embodiments, however, the pulling assembly 103 can include the primary pulling anchor 106 as described above. In other embodiments, the pulling assembly 103 and the cover 115 can each include one or more primary pulling anchors 106.

A first end of the connection link 620 can be coupled to the hose deck 398, e.g., via a pin or other connector 1410. In some embodiments, the first end of the connection link 620 can be coupled to one or more slots 1415 that can be formed in or otherwise defined by one or more base plates (two are shown) 1420. In this embodiment, the first end of the connection link 620 can slide or otherwise move along a length of the slots 1415. In some embodiments, the slots 1415 can be angled (as shown), pear shaped, rectangular in shape, elliptical in shape, or can have any other desired geometrical shape. If the slots 1415 have an angular shape, the angle can be perpendicular relative to the hose deck 398, horizontal relative to the hose deck 398, or any angular orientation therebetween.

Once the assembly 101 has been pulled into position on the guide rail 610 with the jumper winch 392 (see FIGS. 3 and 5), the second end of the connection link 620 can be connected to a connection link anchor 210 disposed on the pulling assembly 103. For example, a pin or other connector 1425 can connect the second end of the connection link 620 to the connection link anchor 210. The slots 1415 can be appropriately sized to allow the pin or other connector 1425 to be inserted without the connection link 620, the pin or other connector 1410, and base plates 1420 being in a binding position when the pin or other connector 1425 is installed. Once the connection link 620 has been connected to the connection link anchor 210, a tension applied by the jumper winch 392 can be released. As the tension applied by the jumper winch 392 releases, the connection link 620 and the assembly 101 can slide or otherwise move back on the guide rail 610 such that the connection link 620 moves into engagement with a corresponding support element 1430 formed in or on the guide rail 610. It should be understood that in some embodiments the support element 1430 can be a structure separate and apart from the guide rail 610. As the connection link 620 moves into engagement with the support element 1430, the support element 1430 can facilitate alignment of the connector 113 disposed on the end of the hose 115 with a corresponding interface located on the hose deck 398. It should be understood that the support element 1430 and the connection link 620 can have any suitable geometries that can be predisposed to cooperate and passively align with one another in a predetermined orientation once contact therebetween has been made. In some embodiments, the support element 1430 can be a pin or other protrusion and the connection link 620 can have a receiving slot configured to engage with the pin when brought into contact therewith. In other embodiments, the support element 1430 can have a tubular shape and the connecting link 620 can have a curved surface configured to receive the tubular shape. In some embodiments, the support element 1430 can be "U" shaped, "V" shaped, in the form of a notch, or any other configuration that can engage with the connection link 620 to facilitate alignment of the connector 113 with the corresponding interface located on the hose deck 398. Likewise, the connection link 620 can have any desired shape or configuration that can cooperate with the support element 1430.

When the second end of the connection link 620 is connected to the connection link anchor 210 and located in the support element 1430, the support element 1430 and the connection link 620 can support the assembly 101, e.g., the hose 115 and the pulling assembly 103. As such, the jumper winch 392 can be disconnected form the pulling anchor 106. The clamp connector 1405 and the cover 116 can be removed to permit the connector 113 disposed on the end of the hose 115 to be connected to the corresponding interface located on the hose deck 398. In some embodiments, the connector 113 can be connected to the corresponding interface located on the hose deck 398 via the clamp connector 1405 or via one or more mechanical fasteners 119 as described above.

In some embodiments, the connection link 620 can be composed of two or more rigid bodies, e.g., 621 and 622, that can be coupled together. For example, an articulated or hinged connection can couple the rigid bodies 621 and 622 together. The articulated connection can facilitate the movement of the connection link 620 into the support element 1430. In other embodiments, the connection link 620 can be a single rigid body (not shown), e.g., a rod, pipe, pole, or the like. In other embodiments, the connection link 620 can be an actuated cylinder (not shown).

In some embodiments, a valve 1440 can be disposed between the connector 113 and the main body of the hose 115. The valve can prevent fluid flow into and out of the hose 115 until the connector 113 has been properly connected to the corresponding interface located on the hose deck 398.

The present disclosure further relates to any one or more of the following numbered embodiments:

1. An elongated conduit assembly, comprising: two or more elongated conduits; a connector formed on or mechanically linked to a first end of each of the two or more elongated conduits; a pulling assembly at least partially disposed about the two or more elongated conduits and adjacent the first end of each of the two or more elongated conduits, the pulling assembly forming a moveable or fixed sleeve about a portion of an outer surface of each of the two or more elongated conduits, wherein the pulling assembly comprises a primary pulling anchor and a support skid, wherein the support skid is configured to contact a surface upon which the pulling assembly is moved; and a spacer disposed about and between the two or more elongated conduits to separate a portion of the elongated conduits by a distance, wherein the spacer is located adjacent to or at some distance from the connectors.

2. The elongated conduit assembly of paragraph 1, wherein the primary pulling anchor is located above a center of gravity of the two or more elongated conduits.

3. The elongated conduit assembly of paragraph 1 or 2, wherein the primary pulling anchor is configured for mechanically linking a line to the pulling assembly, the line configured to pull the elongated conduit assembly between a first structure and a second structure; and wherein the pulling assembly further comprises a cylinder anchor for mechanically linking a cylinder to the pulling assembly, and a temporary support anchor for mechanically linking a support sling to the pulling assembly.

4. The elongated conduit assembly of any of paragraphs 1 to 3, wherein the support skid is configured to engage with a guide rail disposed on a surface of the first structure or the second structure having an interface configured to connect with the two or more elongated conduits.

5. The elongated conduit assembly of paragraph 4, wherein the guide rail is configured to align the first end of each of the two or more elongated conduits with an end of a corresponding connector on the first structure or the second structure when the support skid engages with the guide rail.

6. The elongated conduit assembly of paragraph 4 or 5, wherein the support skid is configured to fit around the guide rail.

7. The elongated conduit assembly of any of paragraphs 4 to 6, wherein the guide rail further comprises two opposing guide beams disposed along outer edges of the guide rails; and wherein the support skid is configured to fit between the two opposing guide beams 8. The elongated conduit assembly of any of paragraphs 1 to 7, wherein the spacer further comprises a spacer pulling anchor for mechanically linking a line to the spacer, the line configured to pull the elongated conduit assembly between a first structure and a second structure.

9. A method for connecting an elongated conduit system between a first structure and a second structure, comprising: mechanically linking a first jumper winch to a first pulling assembly of an elongated conduit assembly, wherein the elongated conduit assembly comprises two or more elongated conduits and the first pulling assembly is disposed at least partially about the two or more elongated conduits; pulling the first pulling assembly between the first structure and the second structure onto a deck with the first jumper winch; aligning the two or more elongated conduits with two or more corresponding connection interfaces on the deck by pulling the first pulling assembly onto a guide rail; and mechanically linking the two or more elongated conduits to the two or more corresponding connection interfaces.

10. The method of paragraph 9, wherein the first pulling assembly comprises a primary pulling anchor for mechanical linkage with the first jumper winch, and a support skid that engages with the guide rail to align the two or more elongated conduits with the two or more corresponding connection interfaces.

11. The method of paragraph 9 or 10, further comprising mechanically linking a second jumper winch to a second end of the two or more elongated conduits.

12. The method of paragraph 11, wherein the second end of the two or more elongated conduits comprises a second pulling assembly disposed about the two or more elongated conduits adjacent to the second end of each of the two or more elongated conduits, and wherein the second jumper winch is mechanically linked to the second pulling assembly.

13. The method of any of paragraphs 9 to 12, further comprising routing a pull line from the first jumper winch to the first pulling assembly through one or more snatch blocks.

14. The method of any of paragraphs 9 to 13, wherein two or more elongated conduits comprise hoses, and wherein the corresponding connection interfaces comprise pipes.

15. The method of any of paragraphs 9 to 14, wherein mechanically linking the two or more hoses to the corresponding pipes comprises forming a fluid tight connection between the hoses and the pipes.

16. The method of any of paragraphs 9 to 15, wherein mechanically linking the two or more hoses to the corresponding pipes comprises: mechanically linking a cylinder with a cylinder connection sling between a cylinder post disposed on the deck and the first pulling assembly; actuating the cylinder to pull the two or more hoses to the corresponding pipes; and mechanically linking two or more bolts between the hoses and the pipes to form a fluid tight connection between the hoses and the pipes.

17. The method of paragraph 9, wherein the first jumper winch is located on the first structure.

18. The method of any of paragraphs 9 to 17, wherein the first jumper winch is located on the second structure.

19. The method of any of paragraphs 9 to 18, wherein each jumper winch is electrically actuated, pneumatically actuated, hydraulically actuated, or a combination thereof.

20. A method for connecting an elongated conduit assembly between a floating vessel and a tower structure at sea, comprising: mechanically linking a first jumper winch to a first pulling assembly of the elongated conduit assembly, wherein the elongated conduit assembly comprises two or more hoses and the first pulling assembly is disposed about the two or more hoses and adjacent a first end of each of the two or more hoses; pulling the first pulling assembly between the floating vessel and the tower structure onto a hose deck; aligning the two or more hoses with two or more corresponding pipes on the hose deck by pulling the first pulling assembly onto a guide rail; and mechanically linking the two or more hoses to the corresponding pipes.

21. The method of paragraph 20, wherein the first pulling assembly comprises a primary pulling anchor for mechanical linkage with the first jumper winch, and a support skid that engages with the guide rail to align the two or more hoses with the two or more corresponding pipes.

22. The method of paragraph 20 or 21, wherein the hose deck is disposed on the tower structure, and wherein the first jumper winch is disposed on the hose deck.

23. The method of any of paragraphs 20 to 22, further comprising mechanically linking a second jumper winch to a second end of the two or more hoses.

24. The method of any of paragraphs 20 to 23, further comprising routing a pull line from the first jumper winch to the first pulling assembly through one or more snatch blocks.

25. The method of any of paragraphs 20 to 24, wherein mechanically linking the two or more hoses to the corresponding pipes comprises forming a fluid tight connection between the hoses and the pipes.

26. The method of any of paragraphs 20 to 25, wherein mechanically linking the two or more hoses to the corresponding pipes comprises: mechanically linking a cylinder with a cylinder connection sling between a cylinder post disposed on the hose deck and the first pulling assembly, actuating the cylinder to pull the two or more hoses to the corresponding pipes; and mechanically linking two or more bolts between the hoses and pipes to form a fluid tight connection between the hoses and the pipes.

27. An elongated member handling system, comprising: one or more elongated members each elongated member comprising a first end and a second end; a connector formed on or mechanically linked to the first end of each of the one or more elongated members; a pulling assembly at least partially disposed about the one or more elongated members and adjacent the first end of each of the one or more elongated members, the pulling assembly forming a moveable or fixed sleeve about a portion of an outer surface of each of the one or more elongated members, wherein the pulling assembly comprises a primary pulling anchor and a support skid, and wherein the support skid is configured to contact a surface upon which the pulling assembly is moved; and a jumper winch configured to be mechanically linked to the primary pulling anchor, wherein, when the jumper winch is mechanically linked to the primary pulling anchor, the jumper winch is configured to pull the pulling assembly from a first structure to a second structure.

28. The system of paragraph 27, further comprising a connection link having a first end coupled to the second structure, wherein the pulling assembly comprises a connection link anchor configured to engage with and mechanically link to a second end of the connection link.

29. The system of paragraph 28, further comprising at least one support sling assembly having a first end coupled to the second structure, wherein the pulling assembly comprises at least one temporary support anchor configured to engage with and mechanically link to a second end of the at least one support sling.

30. The system of paragraph 28 or 29, wherein the connection link is an actuated cylinder configured to bring each of the one or more connectors into a connection position with a corresponding connection interface located on the second structure by actuating the connection link.

31. The system of any one of paragraphs 27 to 30, wherein the support skid is configured to engage with a guide rail disposed on the second structure; and wherein the guide rail is configured to align each connector with a corresponding connection interface located on the second structure when the pulling assembly is pulled into position on the guide rail.

32. The system of paragraph 31, wherein the support skid is configured to fit at least partially around the guide rail.

33. The system of paragraph 31, wherein the guide rail comprises two opposing guide beams disposed along outer edges of the guide rail; and wherein the support skid is configured to fit between the two opposing guide beams.

34. The system of any one of paragraphs 27 to 33, wherein the system comprises two or more elongated members and a spacer disposed between and at least partially about the two or more elongated members to separate the elongated members by a distance, wherein the spacer is located between the pulling assembly and the second ends of the two or more elongated members.

35. The system of any one of paragraphs 27 to 34, wherein the jumper winch is a first jumper winch, the handling system further comprising a second jumper winch configured to be mechanically linked to the second end of at least one of the one or more elongated members, and wherein, when the second jumper winch is mechanically linked to the second end of the at least one of the one or more elongated members, the second jumper winch is configured to apply a tension to the second end of the at least one of the one or more elongated members.

36. The system of any one of paragraphs 27 to 34, wherein the jumper winch is a first jumper winch and the pulling assembly is a first pulling assembly, the handling system further comprising a second pulling assembly and a second jumper winch, wherein: the second pulling assembly is at least partially disposed about the one or more elongated members and adjacent the second end of each of the one or more elongated members, the second pulling assembly forming a moveable or fixed sleeve about a portion of an outer surface of each of the one or more elongated members, and wherein the second pulling assembly comprises a second primary pulling anchor, and the second jumper winch is configured to be mechanically linked to the second primary pulling anchor of the second pulling assembly, and wherein, when the second jumper winch is mechanically linked to the second primary pulling anchor of the second pulling assembly, the second jumper winch is configured to apply a tension to the second end of the at least one of the one or more elongated members.

37. The system of any one of paragraphs 27 to 36, further comprising one or more support surfaces disposed on the first structure, wherein each support surface is configured to support the one or more elongated members when the pulling assembly is pulled from the first structure to the second structure, and wherein each support surface comprises a moveable surface, a low friction surface, or a combination thereof.

38. The system of paragraph 37, wherein at least one support surface comprises the moveable surface, and wherein the moveable surface comprises a conveyor belt, a plurality of rollers, or a combination thereof.

39. The system of paragraph 37, wherein at least one support surface comprises the low friction surface.

40. The system of paragraph 39, wherein the low friction surface comprises polytetrafluoroethylene, an ultra-high molecular weight polyethylene, a matrix of a fabric reinforced polymer, a high density polyethylene, polyoxymethylene, or a combination thereof.

41. The system of any one of paragraphs 37 to 40, wherein the first structure comprises a vessel, wherein the vessel comprises a first vessel bending shoe, a second vessel bending shoe, or a combination thereof, and wherein the support surface is disposed on the first vessel bending shoe, the second vessel bending shoe, or the combination thereof.

42. The system of any one of paragraphs 27 to 41, wherein the first structure comprises a vessel.

43. The system of any one of paragraphs 27 to 42, wherein the second structure comprises a tower supported by a seafloor.

44. The system of any one of paragraphs 27 to 42, wherein the second structure comprises a buoy floating on a surface of water.

45. The system of paragraph 44, wherein the buoy is moored to a seafloor.

46. The system of any one of paragraphs 27 to 40, wherein the first structure comprises a tower supported by a seafloor.

47. The system of any one of paragraphs 27 to 40, wherein the first structure comprises a buoy floating on a surface of water.

48. The system of paragraph 47, wherein the buoy is moored to a seafloor.

49. The system of any one of paragraphs 46 to 48, wherein the second structure comprises a vessel.

50. An elongated member handling system, comprising: one or more elongated members each member comprising a first end and a second end; a connector formed on or mechanically linked to the first end of each of the one or more elongated members; a pulling assembly at least partially disposed about the one or more elongated members and adjacent the first end of each of the one or more elongated members, the pulling assembly forming a moveable or fixed sleeve about a portion of an outer surface of each of the one or more elongated members, wherein the pulling assembly comprises a primary pulling anchor, a connection link anchor, at least one temporary support anchor, and a support skid, wherein the support skid is configured to contact a surface upon which the pulling assembly is moved; a jumper winch configured to be mechanically linked to the primary pulling anchor, wherein, when the jumper winch is mechanically linked to the primary pulling anchor, the jumper winch is configured to pull the pulling assembly from a first structure to a second structure; a guide rail disposed on the second structure, wherein the guide rail is configured to align each connector with a corresponding connection interface located on the second structure when the pulling assembly is pulled into position on the guide rail; a connection link having a first end coupled to the second structure, wherein the connection link anchor is configured to engage with and mechanically link to a second end of the connection link when the pulling assembly is pulled into position on the guide rail; a second jumper winch configured to be mechanically linked to the second end of at least one of the one or more elongated members, wherein, when the second jumper winch is mechanically linked to the second end of the at least one of the one or more elongated members, the second jumper winch is configured to apply a tension to the second end of the at least one of the one or more elongated members; and a support surface disposed on the first structure, wherein the support surface is configured to support the one or more elongated members when the pulling assembly is pulled from the first structure to the second structure, and wherein the support surface comprises a moveable surface, a low friction surface, or a combination thereof.

51. The system of paragraph 50, further comprising at least one support sling assembly having a first end coupled to the second structure, wherein the pulling assembly comprises at least one temporary support anchor configured to engage with and mechanically link to a second end of the at least one support sling.

52. The system of paragraph 50 or 51, wherein the connection link is an actuated cylinder configured to bring each of the one or more connectors into a connection position with the corresponding connection interface located on the second structure by actuating the connection link.

53. The system of any one of paragraphs 50 to 52, wherein the support skid is configured to fit at least partially around the guide rail.

54. The system of any one of paragraphs 50 to 52, wherein the guide rail comprises two opposing guide beams disposed along outer edges of the guide rail; and wherein the support skid is configured to fit between the two opposing guide beams.

55. The system of any one of paragraphs 50 to 54, wherein the system comprises two or more elongated members and a spacer disposed between and at least partially about the two or more elongated members to separate the elongated members by a distance, wherein the spacer is located between the pulling assembly and the second ends of the two or more elongated members.

56. The system of any one of paragraphs 50 to 55, further comprising a second pulling assembly at least partially disposed about the second end of the one or more elongated members, wherein the second pulling assembly forms a moveable or fixed sleeve about a portion of an outer surface of at least one of the one or more elongated members, wherein the second pulling assembly comprises a second primary pulling anchor, and wherein the second jumper winch is mechanically linked to the second primary pulling anchor of the second pulling assembly.

57. The system of any one of paragraphs 50 to 56, wherein the support surface comprises the moveable surface, and wherein the moveable surface comprises a conveyor belt, a plurality of rollers, or a combination thereof.

58. The system of any one of paragraphs 50 to 56, wherein the support surface comprises the low friction surface, and wherein the low friction surface comprises polytetrafluoroethylene, an ultra-high molecular weight polyethylene, a matrix of a fabric reinforced polymer, a high density polyethylene, polyoxymethylene, or a combination thereof.

59. The system of any one of paragraphs 50 to 58, wherein the first structure comprises a vessel.

60. The system of paragraph 59, wherein the vessel comprises a first vessel bending shoe, a second vessel bending shoe, or a combination thereof, and wherein the support surface is disposed on the first vessel bending shoe, the second vessel bending shoe, or the combination thereof.

61. The system of any one of paragraphs 50 to 60, wherein the second structure comprises a tower supported by a seafloor.

62. The system of any one of paragraphs 50 to 60, wherein the second structure comprises a buoy floating on a surface of water.

63. A method for moving one or more elongated members between a first structure and a second structure, comprising: mechanically linking a jumper winch to a pulling assembly that is at least partially disposed about the one or more elongated members and adjacent a first end of each of the one or more elongated members, the pulling assembly forming a moveable or fixed sleeve about a portion of an outer surface of each of the one or more elongated members, wherein the pulling assembly comprises a primary pulling anchor and a support skid, wherein the support skid is configured to contact a surface upon which the pulling assembly is moved, and wherein a connector is formed on or mechanically linked to the first end of each of the one or more elongated members; pulling the pulling assembly from the first structure to the second structure with the jumper winch; aligning each connector with a corresponding connection interface located on the second structure; and mechanically linking each connector to each corresponding connection interface located on the second structure.

64. The method of paragraph 63, wherein the pulling assembly further comprises a connection link anchor and the second structure further comprises a connection link having a first end coupled to the second structure, the method further comprising mechanically linking a second end of the connection link to the connection link anchor.

65. The method of paragraph 64, wherein the connection link is an actuated cylinder, and wherein mechanically linking each connector to each corresponding connection interface comprises actuating the connection link to bring each connector into a connection position with each corresponding connection interface.

66. The method any one of paragraphs 63 to 65, wherein aligning each connector with each corresponding connection interface comprises engaging the support skid with a guide rail located on the second structure, wherein the guide rail aligns each connector with each corresponding interface as the support skid is pulled into position on the guide rail.

67. The method of any one of paragraphs 63 to 66, wherein the support skid is configured to fit at least partially around the guide rail.

68. The method of any one of paragraphs 63 to 66, wherein the support skid is configured to fit between two opposing guide beams disposed along outer edges of the guide rail.

69. The method of any one of paragraphs 63 to 68, wherein the jumper winch is first jumper winch and the pulling assembly is a first pulling assembly, the method further comprising: mechanically linking a second jumper winch to a second pulling assembly that is at least partially disposed about the one or more elongated members and adjacent a second end of each of the one or more elongated members; and applying tension to the second end of the one or more elongated members with the second jumper winch when then first jumper winch pulls the first pulling assembly from the first structure to the second structure.

70. The method of any one of paragraphs 63 to 68, wherein the jumper winch is first jumper winch, the method further comprising: mechanically linking a second jumper winch to the second end of at least one of the one or more elongated members; and applying tension to the second end of the at least one of the one or more elongated members with the second jumper winch when then first jumper winch pulls the first pulling assembly from the first structure to the second structure.

71. The method of any one of paragraphs 63 to 70, further comprising supporting the one or more elongated members on a support surface located on the first structure when the pulling assembly is pulled from the first structure to the second structure.

72. The method of paragraph 71, wherein the support surface comprises a moveable surface, a low friction surface, or a combination thereof.

73. The method of paragraph 72, wherein support surface comprises the moveable surface, and wherein the moveable surface comprises a conveyor belt, a plurality of rollers, or a combination thereof.

74. The method of paragraph 72, wherein the support surface comprises the low friction surface.

75. The method of paragraph 74, wherein the low friction surface comprises polytetrafluoroethylene, an ultra-high molecular weight polyethylene, a matrix of a fabric reinforced polymer, a high density polyethylene, polyoxymethylene, or a combination thereof.

76. The method of any one of paragraphs 63 to 75, wherein the first structure comprises a vessel.

77. The method of any one of paragraphs 63 to 76, wherein the second structure comprises a tower supported by a seafloor.

78. The method of any one of paragraphs 63 to 76, wherein the second structure comprises a buoy floating on a surface of water.

79. The method of paragraph 78, wherein the buoy is moored to a seafloor.

80. The method of any one of paragraphs 63 to 75, wherein the first structure comprises a tower supported by a seafloor.

81. The method of any one of paragraphs 63 to 75 or 80, wherein the first structure comprises a buoy floating on a surface of water.

82. The method of paragraph 81, wherein the buoy is moored to a seafloor.

83. The method of any one of paragraphs 63 to 75 or 80 to 82, wherein the second structure comprises a vessel.

84. An elongated member handling system, comprising: one or more elongated members, each elongated member comprising a first end and a second end and a connector formed on or mechanically linked to the first end of each of the one or more elongated members, wherein each connector optionally comprises a cover coupled thereto; and a pulling assembly at least partially disposed about the one or more elongated members and adjacent the first end of each of the one or more elongated members, the pulling assembly moveably or fixedly coupled to an outer surface of each of the one or more elongated members, wherein the pulling assembly comprises a support skid configured to contact a surface upon which the pulling assembly is moved, and wherein the pulling assembly or, if present, the optional cover comprises a primary pulling anchor.

85. The system of paragraph 84, further comprising a jumper winch configured to be mechanically linked to the primary pulling anchor, wherein, when the jumper winch is mechanically linked to the primary pulling anchor, the jumper winch is configured to pull the pulling assembly from a first structure to a second structure.

86. The system of paragraph 84 or 85, further comprising a connection link having a first end coupled to the second structure, wherein the pulling assembly comprises a connection link anchor configured to engage with and mechanically link to a second end of the connection link.

87. The system of paragraph 86, wherein the second structure comprises a support element, and wherein, when the connection link anchor is mechanically linked to the second end of the connection link, the connection link is configured to engage with the support element to facilitate alignment of each connector with a corresponding connection interface located on the second structure.

88. The system of paragraph 86 or 87, wherein the second structure comprises a support element, wherein the support element and the connection link are configured to support the one or more elongated members when the pulling assembly is pulled into a position on the second structure and a tension applied thereto by the jumper winch is released.

89. The system of any one of paragraphs 86 to 88, wherein the first end of the connection link is coupled to one or more angled slots defined by one or more base plates coupled to the second structure such that the first end of the connection link can move along a length of the one or more angled slots.

90. The system of any one of paragraphs 86 to 89, wherein the connection link comprises two rigid bodies coupled together, and wherein an articulated connection couples the two rigid bodies together.

91. The system of any one of paragraphs 86 to 90, wherein the connection link is an actuated cylinder configured to bring each of the one or more connectors into a connection position with a corresponding connection interface located on the second structure by actuating the connection link.

92. The system of any one of paragraphs 85 to 91, wherein the support skid is configured to engage with a guide rail disposed on the second structure; and wherein the guide rail is configured to facilitate alignment of each connector with a corresponding connection interface located on the second structure when the pulling assembly is pulled into a position on the guide rail.

93. The system of paragraph 85 to 91, wherein: the support skid is configured to engage with a guide rail disposed on the second structure, the second structure comprises a support element, and when the connection link anchor is mechanically linked to the second end of the connection link, the guide rail and the connection link are configured to facilitate alignment of each connector with a corresponding connection interface located on the second structure when the pulling assembly is pulled into a position on the guide rail.

94. The system of paragraph 92 or 93, wherein: the support skid is configured to fit at least partially around the guide rail, or the guide rail comprises two opposing guide beams disposed along outer edges of the guide rail and the support skid is configured to fit between the two opposing guide beams.

95. The system of any one of paragraphs 84 to 94 the system comprises two or more elongated members, a spacer is disposed between and at least partially about the two or more elongated members to separate the elongated members by a distance, and the spacer is located between the pulling assembly and the second ends of the two or more elongated members.

96. The system of any one of paragraphs 84 to 95, wherein the jumper winch is a first jumper winch, the handling system further comprising a second jumper winch configured to be mechanically linked to the second end of at least one of the one or more elongated members, and wherein, when the second jumper winch is mechanically linked to the second end of the at least one of the one or more elongated members, the second jumper winch is configured to apply a tension to the second end of the at least one of the one or more elongated members.

97. The system of any one of paragraphs 84 to 95, wherein the jumper winch is a first jumper winch, the pulling assembly is a first pulling assembly, and the primary pulling anchor is a first primary pulling anchor, the handling system further comprising a second pulling assembly and a second jumper winch, wherein: the second pulling assembly is at least partially disposed about the one or more elongated members and adjacent the second end of each of the one or more elongated members, the second pulling assembly moveably or fixedly coupled to an outer surface of each of the one or more elongated members, and wherein the second pulling assembly comprises a second primary pulling anchor, and the second jumper winch is configured to be mechanically linked to the second primary pulling anchor, and when the second jumper winch is mechanically linked to the second primary pulling anchor, the second jumper winch is configured to apply a tension to the second end of the at least one of the one or more elongated members.

98. The system of any one of paragraphs 84 to 97, further comprising one or more support surfaces disposed on the first structure, wherein each support surface is configured to support the one or more elongated members when the pulling assembly is pulled from the first structure to the second structure, and wherein each support surface comprises a moveable surface, a low friction surface, or a combination thereof.

99. The system of paragraph 98, wherein at least one support surface comprises the moveable surface, and wherein the moveable surface comprises a conveyor belt, a plurality of rollers, or a combination thereof.

100. The system of paragraph 98 or 99, wherein at least one support surface comprises the low friction surface, and wherein the low friction surface comprises polytetrafluoroethylene, an ultra-high molecular weight polyethylene, a matrix of a fabric reinforced polymer, a high density polyethylene, polyoxymethylene, or a combination thereof.

101. The system of any one of paragraphs 98 to 100, wherein: the first structure comprises a vessel, the vessel comprises a first vessel bending shoe, a second vessel bending shoe, or a combination thereof, and at least one support surface is disposed on the first vessel bending shoe or the second vessel bending shoe.

102. The system of any one of paragraphs 98 to 101, wherein: the first structure comprises a vessel, the vessel comprises a first vessel bending shoe and a second vessel bending shoe, and at least one support surface is disposed on the vessel between the first vessel bending shoe and the second vessel bending shoe.

103. The system of any one of paragraphs 84 to 102, wherein the system comprises two or more elongated members, and wherein the pulling assembly comprises the primary pulling anchor.

104. The system of any one of paragraphs 84 to 102, wherein the optional cover is present and comprises the primary pulling anchor.

105. The system of any one of paragraphs 84 to 104, wherein the optional cover is present and is coupled to the connector with a clamp connector.

106. An elongated member handling system, comprising: one or more elongated members each elongated member comprising a first end and a second end and a connector formed on or mechanically linked to the first end of each of the one or more elongated members, wherein each connector optionally comprises a cover coupled thereto; a pulling assembly at least partially disposed about the one or more elongated members and adjacent the first end of each of the one or more elongated members, the pulling assembly moveably or fixedly coupled to an outer surface of each of the one or more elongated members, wherein the pulling assembly comprises a connection link anchor and a support skid, wherein the support skid is configured to contact a surface upon which the pulling assembly is moved, and wherein the pulling assembly or, if present, the optional cover comprises a primary pulling anchor; a first jumper winch configured to be mechanically linked to the primary pulling anchor, wherein, when the first jumper winch is mechanically linked to the primary pulling anchor, the first jumper winch is configured to pull the pulling assembly from a first structure to a second structure; a guide rail disposed on the second structure, wherein the support skid is configured to engage with the guide rail; and wherein the guide rail is configured to facilitate alignment of each connector with a corresponding connection interface located on the second structure when the pulling assembly is pulled into a position on the guide rail; a connection link having a first end coupled to the second structure, wherein the connection link anchor is configured to engage with and mechanically link to a second end of the connection link when the pulling assembly is pulled into the position on the guide rail; a second jumper winch configured to be mechanically linked to the second end of at least one of the one or more elongated members, wherein, when the second jumper winch is mechanically linked to the second end of the at least one of the one or more elongated members, the second jumper winch is configured to apply a tension to the second end of the at least one of the one or more elongated members; and a support surface disposed on the first structure, wherein the support surface is configured to support the one or more elongated members when the pulling assembly is pulled from the first structure to the second structure, and wherein the support surface comprises a moveable surface, a low friction surface, or a combination thereof.

107. A method for moving one or more elongated members from a first structure to a second structure, comprising: mechanically linking a jumper winch to a primary pulling anchor disposed on a pulling assembly or an optional cover, wherein: the pulling assembly is at least partially disposed about the one or more elongated members and adjacent a first end of each of the one or more elongated members, the pulling assembly is moveably or fixedly coupled to an outer surface of each of the one or more elongated members, the pulling assembly comprises a support skid, the support skid is configured to contact a surface upon which the pulling assembly is moved, a connector is formed on or mechanically linked to the first end of each of the one or more elongated members, and the optional cover, if present, is coupled to the connector; pulling the pulling assembly from the first structure to the second structure with the jumper winch; aligning each connector with a corresponding connection interface located on the second structure; and mechanically linking each connector to each corresponding connection interface located on the second structure.

108. The method of paragraph 107, wherein the pulling assembly further comprises a connection link anchor and the second structure further comprises a connection link having a first end coupled to the second structure, the method further comprising mechanically linking a second end of the connection link to the connection link anchor once the pulling assembly is pulled from the first structure to the second structure.

109. The method of paragraph 108, wherein the first end of the connection link is coupled to one or more angled slots defined by one or more base plates coupled to the second structure such that the first end of the connection link can move along a length of the one or more angled slots.

110. The method of paragraph 108 or 109, wherein the second structure comprises a support element, and wherein, when the connection link anchor is mechanically linked to the second end of the connection link, the connection link engages with the support element to facilitate alignment of each connector with a corresponding connection interface located on the second structure.

111. The method of any one of paragraphs 108 to 110, wherein the second structure comprises a support element, and wherein the support element and the connection link are configured to support the one or more elongated members once the pulling assembly is pulled from the first structure to the second structure.

112. The method of any one of paragraphs 108 to 111, wherein the connection link comprises two rigid bodies coupled together, and wherein an articulated connection couples the two rigid bodies together.

113. The method of any one of paragraphs 108 to 111, wherein the connection link is an actuated cylinder, and wherein mechanically linking each connector to each corresponding connection interface comprises actuating the connection link to bring each connector into a connection position with each corresponding connection interface.

114. The method of any one of paragraphs 107 to 113, wherein aligning each connector with each corresponding connection interface comprises engaging the support skid with a guide rail located on the second structure, wherein the guide rail aligns each connector with each corresponding interface as the support skid is pulled into position on the guide rail.

115. The method of any one of paragraphs 107 to 114, wherein the jumper winch is a first jumper winch, the method further comprising: mechanically linking a second jumper winch to the second end of at least one of the one or more elongated members, and applying tension to the second end of the at least one of the one or more elongated members when the pulling assembly is pulled from the first structure to the second structure with the first jumper winch.

116. The method of any one of paragraphs 107 to 115, further comprising supporting the one or more elongated members on a moveable surface, a low friction surface, or a combination thereof located on the first structure when the pulling assembly is pulled from the first structure to the second structure.

117. The method of paragraph 116, wherein the one or more elongated members are supported on the moveable surface.

118. The method of paragraph 117, wherein the moveable surface comprises a conveyor belt, one or more roller bars, or a combination thereof.

119. The method of paragraph 116, wherein the one or more elongated members are supported on the low friction surface 120. The method of paragraph 119, wherein the low friction surface comprises polytetrafluoroethylene, an ultra-high molecular weight polyethylene, a matrix of a fabric reinforced polymer, a high density polyethylene, polyoxymethylene, or a combination thereof.

121. The method of any one of paragraphs 107 to 120, wherein the second structure further comprises a support element, wherein aligning each connector with the corresponding connection interface located on the second structure further comprises supporting the one or more elongated members by positioning the connection link in abutting relation to the support element and mechanically releasing the jumper winch from the primary pulling anchor.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. An elongated member handling system, comprising:
one or more elongated members, each elongated member comprising a first end and a second end and a connector formed on or mechanically linked to the first end of each of the one or more elongated members, wherein each connector optionally comprises a cover coupled thereto;
a pulling assembly at least partially disposed about the one or more elongated members and adjacent the first end of each of the one or more elongated members, the pulling assembly moveably or fixedly coupled to an outer surface of each of the one or more elongated members, wherein the pulling assembly comprises a support skid configured to contact a surface upon which the pulling assembly is moved, and wherein the pulling assembly comprises a primary pulling anchor or, if present, the cover optionally comprises the primary pulling anchor;
a first jumper winch configured to be mechanically linked to the primary pulling anchor, wherein, when the first jumper winch is mechanically linked to the primary pulling anchor, the first jumper winch is configured to pull the pulling assembly from a first structure to a second structure; and
a second jumper winch configured to be mechanically linked to the second end of at least one of the one or more elongated members, wherein, when the second jumper winch is mechanically linked to the second end of the at least one of the one or more elongated members, the second jumper winch is configured to apply a tension to the second end of the at least one of the one or more elongated members.

2. The system of claim 1, further comprising a connection link having a first end coupled to the second structure, wherein the pulling assembly comprises a connection link anchor configured to engage with and mechanically link to a second end of the connection link.

3. The system of claim 2, wherein the second structure comprises a support element, and wherein, when the connection link anchor is mechanically linked to the second end of the connection link, the connection link is configured to engage with the support element to facilitate alignment of each connector with a corresponding connection interface located on the second structure.

4. The system of claim 2, wherein the second structure comprises a support element, wherein the support element and the connection link are configured to support the one or more elongated members when the pulling assembly is pulled into a position on the second structure and a tension applied thereto by the first jumper winch is released.

5. The system of claim 2, wherein the first end of the connection link is coupled to one or more slots defined by one or more base plates coupled to the second structure such that the first end of the connection link can move along a length of the one or more slots.

6. The system of claim 2, wherein the connection link comprises two rigid bodies coupled together, and wherein an articulated connection couples the two rigid bodies together.

7. The system of claim 1, wherein the support skid is configured to engage with a guide rail disposed on the second structure; and wherein the guide rail is configured to facilitate alignment of each connector with a corresponding connection interface located on the second structure when the pulling assembly is pulled into a position on the guide rail.

8. The system of claim 7, wherein:
the support skid is configured to fit at least partially around the guide rail, or
the guide rail comprises two opposing guide beams disposed along outer edges of the guide rail and the support skid is configured to fit between the two opposing guide beams.

9. The system of claim 1, wherein:
the system comprises two or more elongated members,
a spacer is disposed between and at least partially about the two or more elongated members to separate the elongated members by a distance, and
the spacer is located between the pulling assembly and the second ends of the two or more elongated members.

10. The system of claim 1, further comprising a second pulling assembly, wherein:
the second pulling assembly is at least partially disposed about the one or more elongated members and adjacent the second end of each of the one or more elongated members, the second pulling assembly moveably or fixedly coupled to an outer surface of each of the one or more elongated members, and wherein the second pulling assembly comprises a primary pulling anchor, and
the second jumper winch is configured to be mechanically linked to the primary pulling anchor of the second pulling assembly, and.

11. The system of claim 1, further comprising one or more support surfaces disposed on the first structure, wherein each support surface is configured to support the one or more elongated members when the pulling assembly is pulled from the first structure to the second structure, and wherein each support surface comprises a moveable surface, a low friction surface, or a combination thereof.

12. The system of claim 11, wherein at least one support surface comprises the moveable surface, and wherein the moveable surface comprises a conveyor belt, a plurality of rollers, or a combination thereof.

13. The system of claim 11, wherein at least one support surface comprises the low friction surface, and wherein the low friction surface comprises polytetrafluoroethylene, an ultra-high molecular weight polyethylene, a matrix of a fabric reinforced polymer, a high density polyethylene, polyoxymethylene, or a combination thereof.

14. The system of claim 11, wherein:
the first structure comprises a vessel,
the vessel comprises a first vessel bending shoe and a second vessel bending shoe,
at least one support surface is disposed on the vessel between the first vessel bending shoe and the second vessel bending shoe, and
the support surface, the first vessel bending shoe, and the second vessel bending shoe are fixed in place relative to the vessel.

15. An elongated member handling system, comprising:
one or more elongated members, each elongated member comprising a first end and a second end and a connector formed on or mechanically linked to the first end of each of the one or more elongated members, wherein each connector comprises an optional cover coupled thereto;
a pulling assembly at least partially disposed about the one or more elongated members and adjacent the first end of each of the one or more elongated members, the pulling assembly moveably or fixedly coupled to an outer surface of each of the one or more elongated members, wherein the pulling assembly comprises a connection link anchor and a support skid, wherein the support skid is configured to contact a surface upon which the pulling assembly is moved, and wherein the pulling assembly comprises a primary pulling anchor or, if present, the cover optionally comprises the primary pulling anchor;
a first jumper winch configured to be mechanically linked to the primary pulling anchor, wherein, when the first jumper winch is mechanically linked to the primary pulling anchor, the first jumper winch is configured to pull the pulling assembly from a first structure to a second structure;
a guide rail disposed on the second structure, wherein the support skid is configured to engage with the guide rail; and wherein the guide rail is configured to facilitate alignment of each connector with a corresponding connection interface located on the second structure when the pulling assembly is pulled into a position on the guide rail;
a connection link having a first end coupled to the second structure, wherein the connection link anchor is configured to engage with and mechanically link to a second end of the connection link when the pulling assembly is pulled into the position on the guide rail;
a second jumper winch configured to be mechanically linked to the second end of at least one of the one or more elongated members, wherein, when the second jumper winch is mechanically linked to the second end of the at least one of the one or more elongated members, the second jumper winch is configured to apply a tension to the second end of the at least one of the one or more elongated members; and
a support surface disposed on the first structure, wherein the support surface is configured to support the one or more elongated members when the pulling assembly is pulled from the first structure to the second structure, and wherein the support surface comprises a moveable surface, a low friction surface, or a combination thereof.

16. A method for moving one or more elongated members from a first structure to a second structure, comprising:
mechanically linking a first jumper winch to a primary pulling anchor disposed on a pulling assembly or an optional cover, wherein:
the pulling assembly is at least partially disposed about the one or more elongated members and adjacent a first end of each of the one or more elongated members,
the pulling assembly is moveably or fixedly coupled to an outer surface of each of the one or more elongated members,
the pulling assembly comprises a support skid,
the support skid is configured to contact a surface upon which the pulling assembly is moved,
a connector is formed on or mechanically linked to the first end of each of the one or more elongated members, and
the optional cover, if present, is coupled to the connector;
mechanically linking a second jumper winch to the second end of at least one of the one or more elongated members;
pulling the pulling assembly from the first structure to the second structure with the first jumper winch;
applying a tension to the second end of the at least one of the one or more elongated members with the second jumper winch when the pulling assembly is pulled from the first structure to the second structure with the first jumper winch;
aligning each connector with a corresponding connection interface located on the second structure; and
mechanically linking each connector to each corresponding connection interface located on the second structure.

17. The method of claim 16, wherein the pulling assembly further comprises a connection link anchor and the second structure further comprises a connection link having a first end coupled to the second structure, the method further comprising mechanically linking a second end of the connection link to the connection link anchor once the pulling assembly is pulled from the first structure to the second structure.

18. The method of claim 17, wherein the second structure comprises a support element, and wherein the support element and the connection link are configured to support the one or more elongated members once the pulling assembly is pulled from the first structure to the second structure.

19. The method of claim 16, further comprising supporting the one or more elongated members on a moveable surface, a low friction surface, or a combination thereof located on the first structure when the pulling assembly is pulled from the first structure to the second structure.

20. The system of claim 2, wherein the connection link comprises two rigid bodies coupled together via a hinged connection, and wherein the first end of the connection link is moveably coupled to one or more slots defined by one or more base plates coupled to the second structure such that the first end of the connection link can move along a length of the one or more slots.

21. The system of claim 1, wherein the first jumper winch and the second jumper winch are configured to be mechanically linked at the same time to the primary pulling anchor and to the second end of the at least one of the one or more elongated members, respectively, and wherein, when the first jumper winch and the second jumper winch are mechanically linked to the primary pulling anchor and the at least one of the one or more elongated members, respectively, the first jumper winch and the second jumper winch are configured to simultaneously pull the pulling assembly and apply the tension, respectively.

* * * * *